US012585097B2

(12) United States Patent
Teramura

(10) Patent No.: US 12,585,097 B2
(45) Date of Patent: Mar. 24, 2026

(54) OPTICAL APPARATUS

(71) Applicant: CANON KABUSHIKI KAISHA, Tokyo (JP)

(72) Inventor: Masayasu Teramura, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 18/066,923

(22) Filed: Dec. 15, 2022

(65) Prior Publication Data

US 2023/0194842 A1     Jun. 22, 2023

(30) Foreign Application Priority Data

Dec. 22, 2021     (JP) .................................. 2021-207657

(51) Int. Cl.
*G02B 19/00*          (2006.01)
*G01N 15/1434*        (2024.01)

(52) U.S. Cl.
CPC ..... *G02B 19/0023* (2013.01); *G01N 15/1434* (2013.01); *G02B 19/0076* (2013.01)

(58) Field of Classification Search
None
See application file for complete search history.

(56) References Cited

U.S. PATENT DOCUMENTS

2001/0038597 A1* 11/2001 Shimozono .......... G11B 7/1374
                                                                369/112.26
2021/0302309 A1*  9/2021 Ikeda ................. G01N 21/3504

FOREIGN PATENT DOCUMENTS

| JP | H07229832 A | 8/1995 |
|----|-------------|--------|
| JP | H10123049 A | 5/1998 |
| JP | 2000111474 A | 4/2000 |
| JP | 2017026545 A | 2/2017 |
| JP | 2019219367 A | 12/2019 |
| JP | 2021144027 A | 9/2021 |

* cited by examiner

*Primary Examiner* — Robert E. Tallman
(74) *Attorney, Agent, or Firm* — Canon U.S.A., Inc. IP Division

(57)          ABSTRACT

An apparatus according to the aspect of the embodiments includes a light source, a first surface configured to reflect light from the light source toward an object, a second surface with a shape different from a shape of the first surface in which the second surface is configured to reflect a part of the light from the object toward the object, and a third surface configured to reflect a part of the light reflected by the second surface and then reflected by the object, toward a light receiving element.

19 Claims, 18 Drawing Sheets

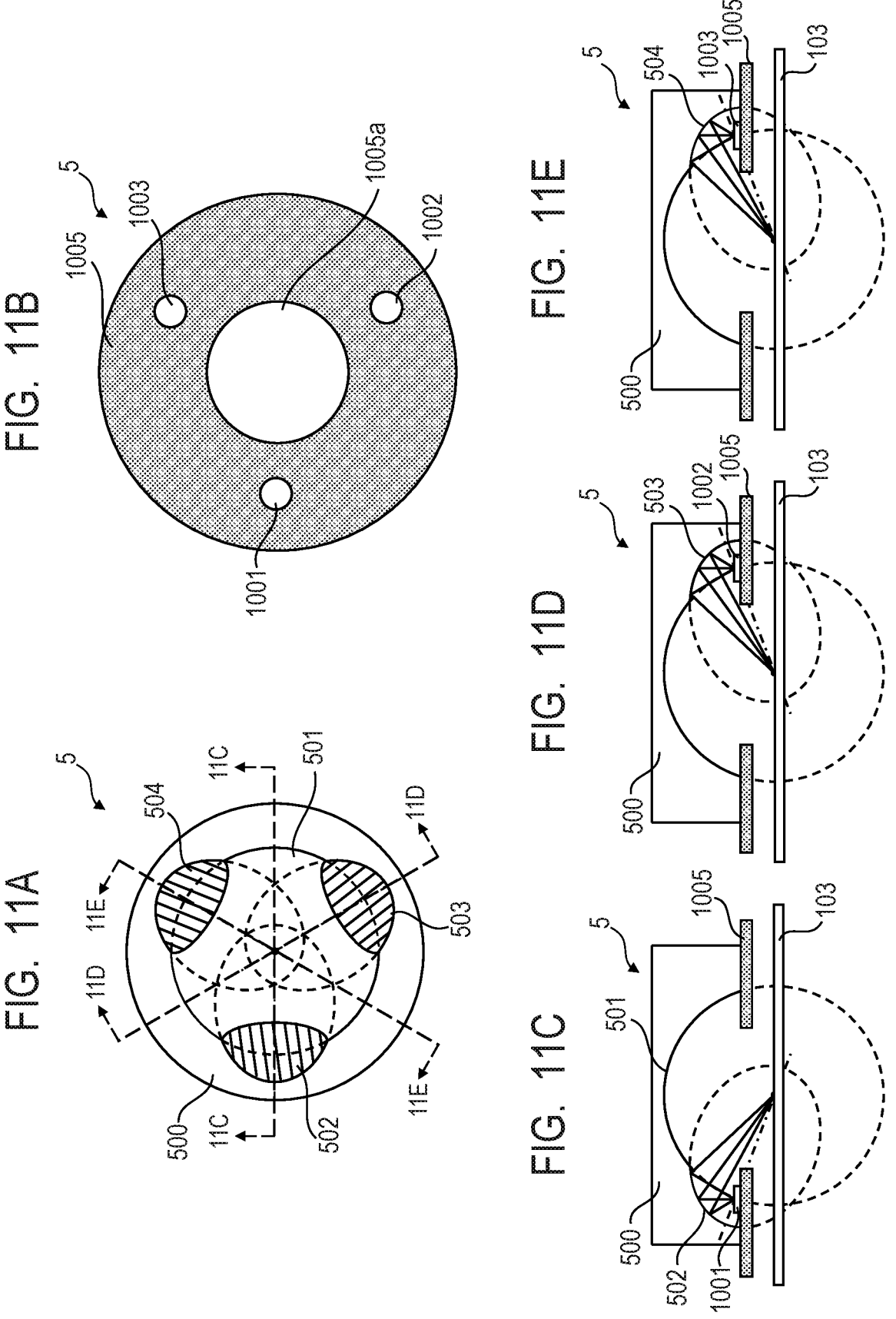

800a, 800b 801a, 801b

8

14B

14B 802a, 802b

8

800a

801a

802a

100

1051

1052

104

802b

800b

801b

103

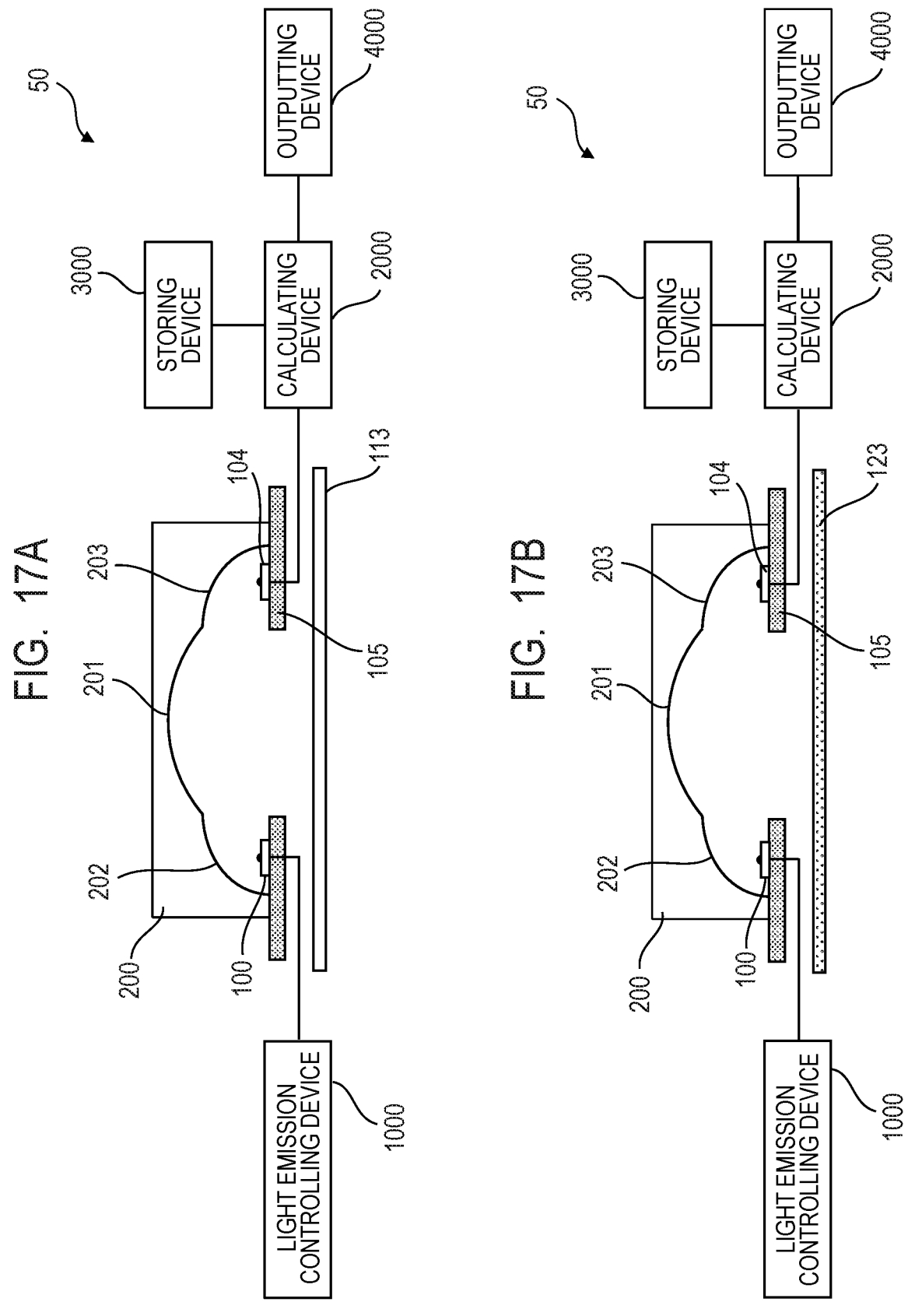

OPTICAL APPARATUS

BACKGROUND

Technical Field

The aspect of the embodiments is related to an optical apparatus.

Description of the Related Art

Conventionally, there is known an optical apparatus which detects a material included in an object by receiving light reflected or scattered by the object.

Japanese Patent Application Laid-Open No. 2017-26545 discloses an optical apparatus for detecting particles included in gas by irradiating the gas with light from a light source and then receiving the light scattered by the gas with a light receiving element.

In the optical apparatus disclosed in Japanese Patent Application Laid-Open No. 2017-26545, a size thereof is increased since the light source and the light receiving element are provided on different sides with respect to a flow path of the gas.

SUMMARY

An apparatus according to the aspect of the embodiments includes a light source, a first surface configured to reflect light from the light source toward an object, a second surface with a shape different from a shape of the first surface in which the second surface is configured to reflect a part of the light from the object toward the object, and a third surface configured to reflect a part of the light reflected by the second surface and then reflected by the object, toward a light receiving element.

Further features of the disclosure will become apparent from the following description of exemplary embodiments with reference to the attached drawings.

BRIEF DESCRIPTION OF THE DRAWINGS

FIG. 4 is a graph in which relative light amounts of reflected light are compared with each other in the optical apparatus according to the first embodiment.

FIG. 8 is a graph illustrating a breakdown in a light amount of received light in accordance with the number of reflections in the optical apparatus according to the second embodiment.

FIG. 11A is a partial projection view of an optical apparatus according to a fifth embodiment of the disclosure.

FIG. 11B is a partial top view of the optical apparatus according to the fifth embodiment.

FIG. 11C is a cross-sectional view taken along a line 11C-11C of the optical apparatus according to the fifth embodiment.

FIG. 11D is a cross-sectional view taken along a line 11D-11D of the optical apparatus according to the fifth embodiment.

FIG. 11E is a cross-sectional view taken along a line 11E-11E of the optical apparatus according to the fifth embodiment.

FIG. 17A is a schematic cross-sectional view of a measuring apparatus including the optical apparatus according to the disclosure.

FIG. 17B is a schematic cross-sectional view of a measuring apparatus including the optical apparatus according to the disclosure.

DESCRIPTION OF THE EMBODIMENTS

Hereinafter, an optical apparatus according to the aspect of the embodiments is described in detail with reference to the accompanying drawings. The drawings described below may be drawn on a scale different from the actual scale in order to facilitate understanding of the aspect of the embodiments.

First Embodiment

Conventionally, there has been proposed an optical apparatus which efficiently collects diffused light from an illuminated object onto a light receiving element by using a spherical reflecting surface and a spheroidal reflecting surface.

For example, there is known a detecting device for detecting fine particles included in the atmosphere by using an optical system in which a focal point of a spheroidal reflecting surface and a center of a spherical reflecting surface are located at the same position.

Further, there is known an inspecting apparatus for inspecting a surface of an object by irradiating the object with light from a light source using a spherical reflecting surface.

In the conventional optical apparatus as described above, there are issues that it is increased in size since another apparatus is required for efficiently illuminating light from the light source, and it is difficult to efficiently irradiate an object with light from the light source since light reflected by an inner surface of the spherical reflecting surface is used.

Accordingly, an object of the present embodiment is to provide an optical apparatus capable of efficiently irradiating an object with light from a light source in a compact structure.

Figure 1:
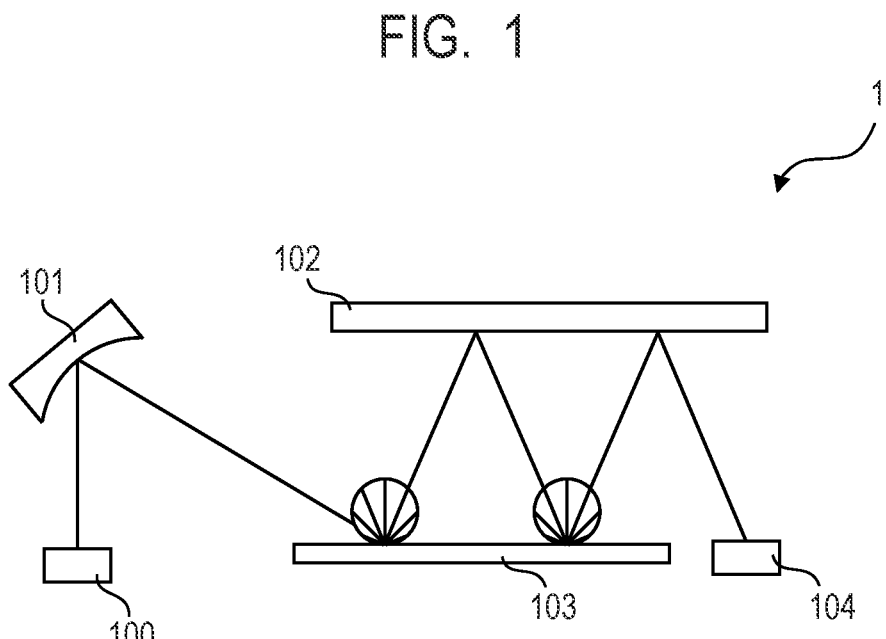
FIG. 1 is a schematic cross-sectional view of an optical apparatus according to a first embodiment of the disclosure.

FIG. 1 shows a schematic cross-sectional view of an optical apparatus 1 according to a first embodiment of the disclosure.

The optical apparatus 1 according to the present embodiment includes a light source 100, a first reflecting surface 101 and a second reflecting surface 102.

The light source 100 is a light emitting unit such as a light emitting diode (LED), and is configured to emit light toward the first reflecting surface 101.

As the light source 100, a light emitting element or a light emitting device such as a laser light source or a spectral light source may be used instead of the light emitting diode.

The first reflecting surface 101 is a reflecting means such as a mirror, and has a concave curvature, namely a convex power (a refractive power) in a cross section (a cross section parallel to a paper surface) including a center of the light source 100 and perpendicular to a reference plane parallel to an object 103 in order to efficiently illuminate the object 103.

The second reflecting surface 102 is a reflection means such as a mirror, and has a linear shape in the cross section (the cross section parallel to the paper surface) including the center of the light source 100 and perpendicular to the reference plane parallel to the object 103.

That is, the first reflecting surface 101 and the second reflecting surface 102 have different shapes. Further, the first reflecting surface 101 and the second reflecting surface 102 are spaced apart from each other.

A light receiving element 104 is a light receiving unit such as a photodiode (PD), and is configured to receive a part of the light reflected by the second reflecting surface 102.

As shown in FIG. 1, light emitted from the light source 100 is incident on the first reflecting surface 101 in the optical apparatus 1 according to the present embodiment.

Then, the light reflected by the first reflecting surface 101 toward the object 103 is reflected by the object 103, and then a part of the reflected light is incident on the second reflecting surface 102.

Next, the light reflected by the second reflecting surface 102 is incident on the object 103 again.

Then, a part of the light reflected by the object 103 is incident on the second reflecting surface 102 again.

Then, a part of the light reflected by the second reflecting surface 102 is incident on the light receiving element 104.

That is, in the optical apparatus 1 according to the present embodiment, the first reflecting surface 101 can be defined as a reflecting region configured to reflect light from the light source 100 toward the object 103, and the second reflecting surface 102 can be defined as a reflecting region configured to reflect a part of light from the object 103 toward the object 103.

Figure 2A:
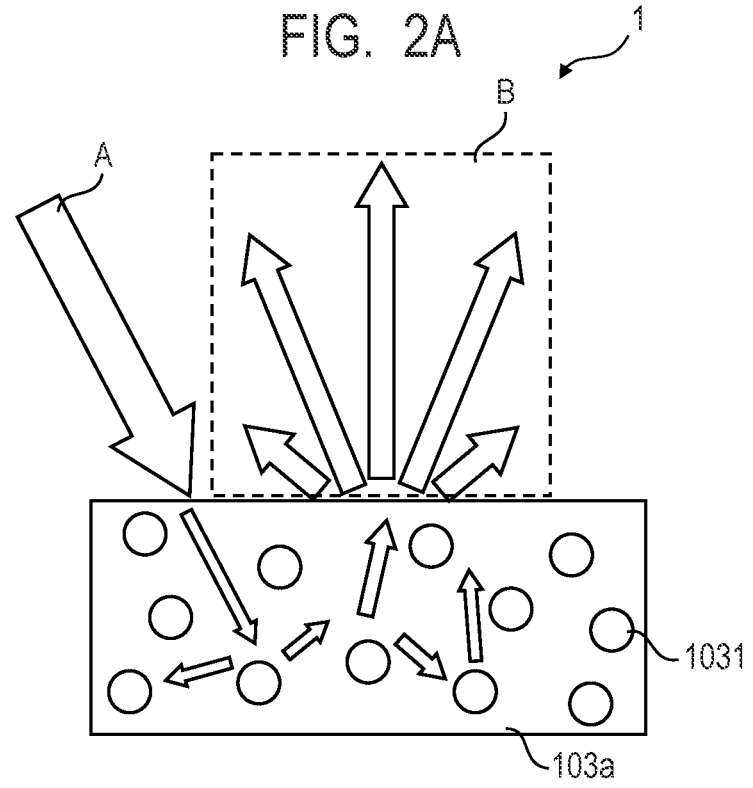
FIG. 2A is a schematic view illustrating a state in which light is reflected by an object in the optical apparatus according to the first embodiment.
Figure 2B:
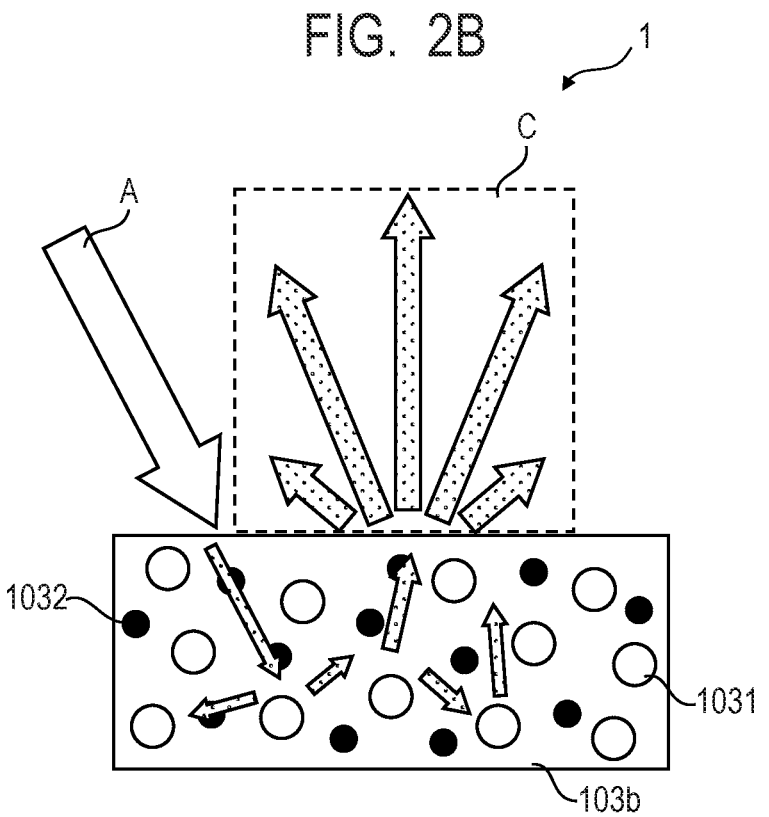
FIG. 2B is a schematic view illustrating a state in which light is reflected by an object in the optical apparatus according to the first embodiment.

FIGS. 2A and 2B show a schematic view illustrating a state in which light is reflected by objects 103a and 103b in the optical apparatus 1 according to the present embodiment, respectively.

An object 103 illuminated in the optical apparatus 1 according to the present embodiment is a member which reflects light, such as a white plate.

As the object 103, paper, powder, a liquid or gaseous object or the like may be used instead of the white plate.

The object 103 generally includes a main substance 1031 which is a substance mainly constituting the object 103, and impurities 1032 other than the main substance 1031.

Here, a substance such as barium sulfate which reflects a part of incident light according to a reflectivity can be considered as the main substance 1031, and a substance such as graphite which absorbs a part of the incident light according to an absorptivity is considered as the impurity 1032, for example.

Further, a substance which reflects a part of incident light according to a reflectivity such as cellulose or a fluorinebased resin can be considered as the main substance 1031, and a substance which absorbs a part of the incident light according to an absorptivity such as water can be considered as the impurity 1032.

The object 103 to be illuminated in the optical apparatus 1 according to the present embodiment is not limited to the above-described combination as long as it includes the main substance 1031 which reflects a part of incident light in accordance with the reflectivity and the impurity 1032 which absorbs a part of the incident light in accordance with the absorptivity, and various combinations are conceivable.

As shown in FIG. 2A, it is assumed that the object 103a contains the main substance 1031 and does not contain the impurity 1032.

At this time, when light A reflected by the first reflecting surface 101 is incident on the object 103a, the light A interacts with the main substance 1031 inside the object 103a. Thereby, light B is diffusely reflected from a surface of the object 103a.

On the other hand, as shown in FIG. 2B, it is assumed that the impurity 1032 is also included in the object 103b in addition to the main substance 1031.

At this time, when the light A reflected by the first reflecting surface 101 is incident on the object 103b, the light A interacts with the main substance 1031 and the impurity 1032 inside the object 103b. Thereby, light C is diffusely reflected from a surface of the object 103b.

Accordingly, the light B reflected by the object 103a and the light C reflected by the object 103b are received by using the light receiving element 104, and light amounts thereof are compared with each other in the optical apparatus 1 according to the present embodiment.

As a result, a ratio of the impurity 1032 to the main substance 1031 in the 103b of the object can be detected.

Figure 3:
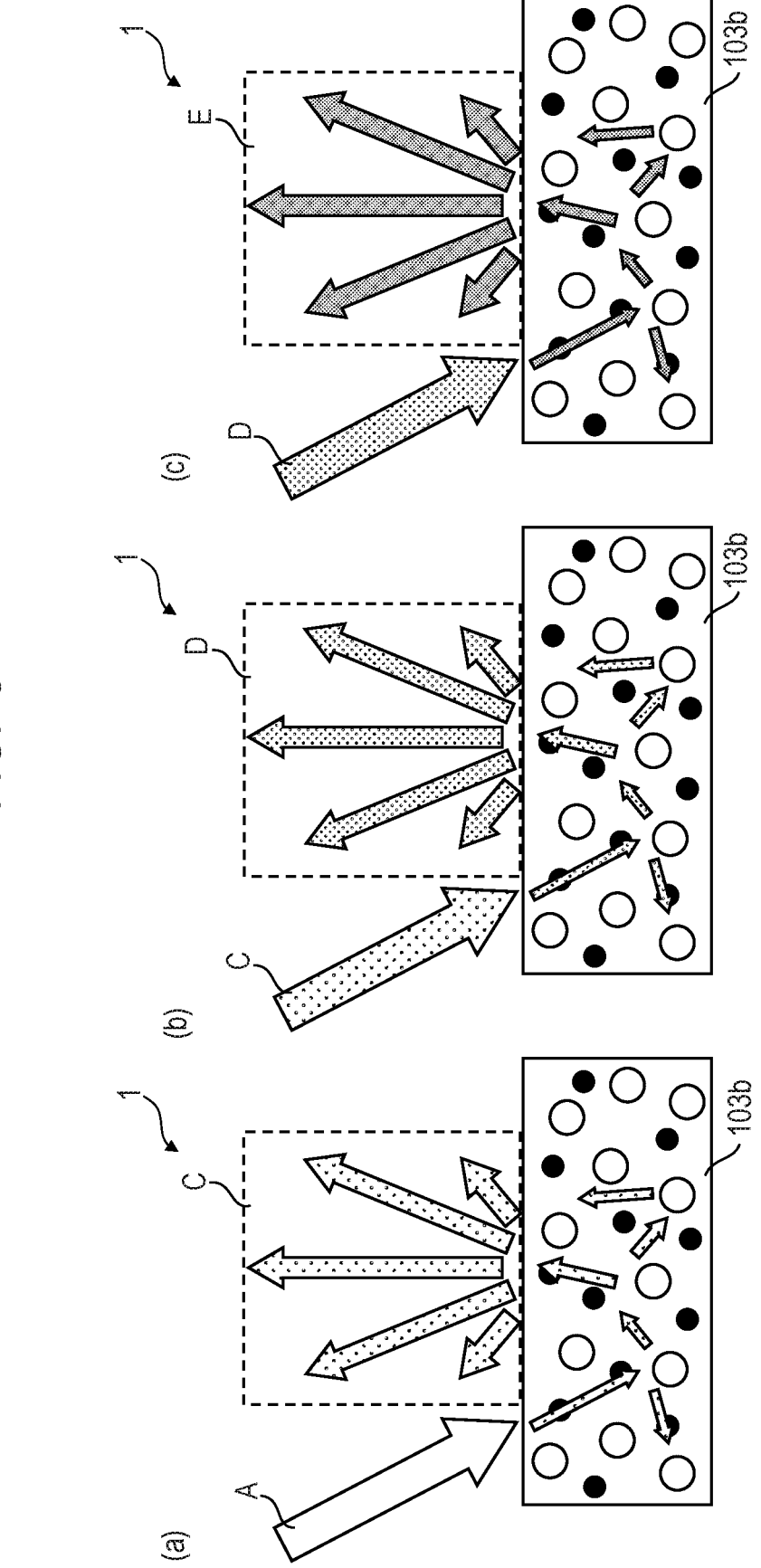
FIG. 3 is a schematic view illustrating a state in which light is reflected by an object in the optical apparatus according to the first embodiment.

FIG. 3 shows a schematic view illustrating a state in which light reflected by the object 103b is incident again on the object 103b via the second reflecting surface 102 in the optical apparatus 1 according to the present embodiment.

First, as shown in (a) of FIG. 3, when light A reflected by the first reflecting surface 101 is incident on the object 103b, the light A interacts with the main substance 1031 and the impurity 1032 inside the object 103b. Thereby, light C is diffusely reflected from a surface of the object 103b.

Next, the light C diffusely reflected from the surface of the object 103b is reflected by the second reflecting surface 102 as described above. Thereby, it is incident on the object 103b again as shown in (b) of FIG. 3.

Then, when the light C reflected by the second reflecting surface 102 is incident on the object 103b, the light C interacts with the main substance 1031 and the impurity 1032 inside the object 103b. Thereby, light D is diffusely reflected from the surface of the object 103b.

Next, the light D diffusely reflected from the surface of the object 103b is reflected by the second reflecting surface 102 as described above. Thereby, it is incident on the object 103b again as shown in (c) of FIG. 3.

Then, when the light D reflected by the second reflecting surface 102 is incident on the object 103b, the light D interacts with the main substance 1031 and the impurity 1032 inside the object 103b. Thereby, light E is diffusely reflected from the surface of the object 103b.

As described above, the number of interactions between the light and the main substance 1031 or the impurity 1032 contained in the object 103 can be increased by causing the light to be incident on the object 103 again by the second reflecting surface 102 in the optical apparatus 1 according to the present embodiment.

Since the impurity 1032 absorbs a part of the incident light as described above, the light amount of the light reflected by the object 103b decreases as the number of interactions increases.

Figure 4:
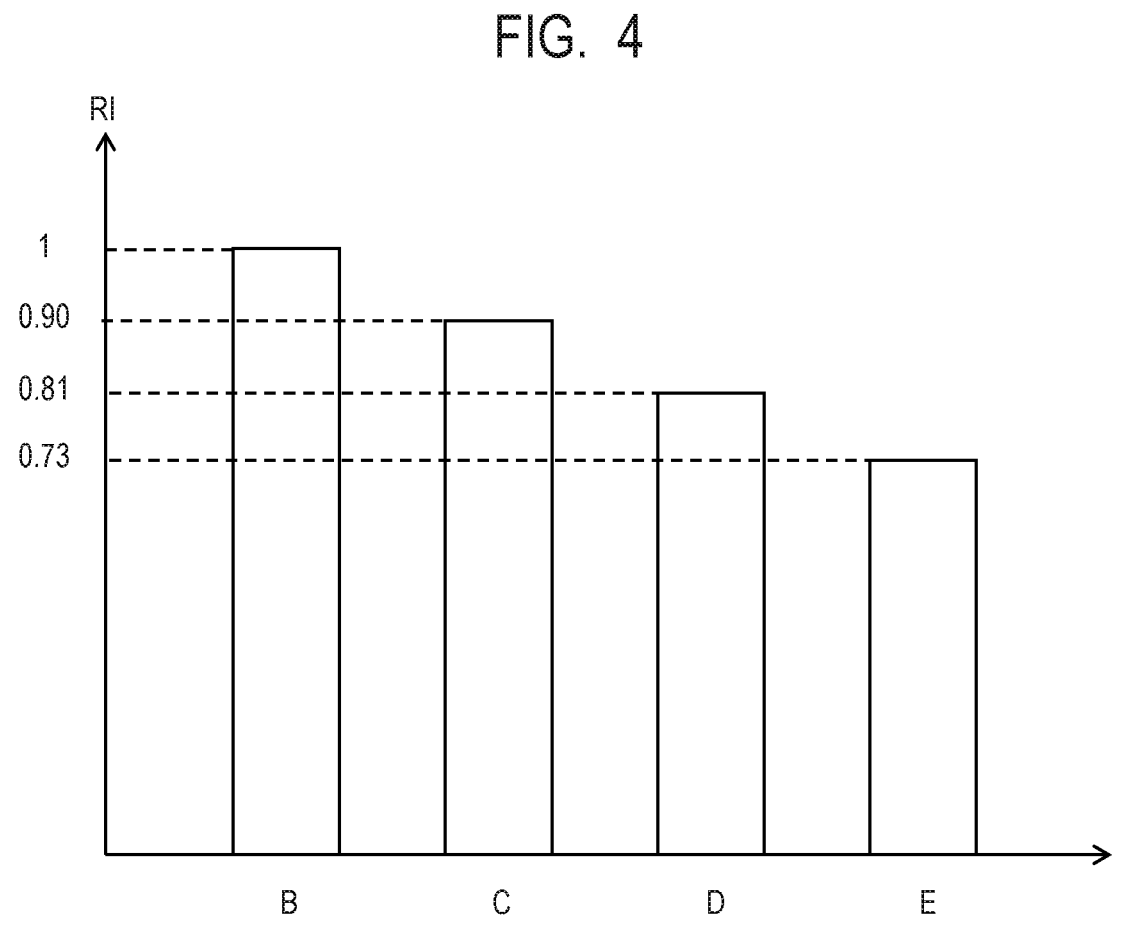

FIG. 4 shows a graph in which relative light amounts RI of respective lights in the examples shown in FIGS. 2A, 2B and 3 are compared with each other.

In FIG. 4, the relative light amount RI when the light receiving element 104 receives the light B reflected from the surface of the object 103a not containing the impurity 1032 as shown in FIG. 2A is set to 1.

Then, as shown in (a) of FIG. 3, when the light A reflected by the first reflecting surface 101 is incident on the object 103b containing the impurity 1032, the light A interacts with the impurity 1032 (a first time) to be partially absorbed, and then the light C is diffusely reflected from the surface of the object 103b.

At this time, it is assumed that the relative light amount RI of the light C decreases to 0.90.

Then, as shown in (b) of FIG. 3, when the light C is reflected by the second reflecting surface 102 to be incident on the object 103b again, the light C interacts with the impurity 1032 again (a second time) to be partially absorbed, and then the light D is diffusely reflected from the surface of the object 103b.

At this time, the relative light amount RI of the light D decreases to 0.81.

Next, as shown in (c) of FIG. 3, when the light D is reflected by the second reflecting surface 102 to be incident on the object 103b again, the light D interacts with the impurity 1032 again (a third time) to be partially absorbed, and then the light E is diffusely reflected from the surface of the object 103b.

Thereby, the relative light amount RI of the light E decreases to 0.73.

Figures 5A, 5B, 5C:
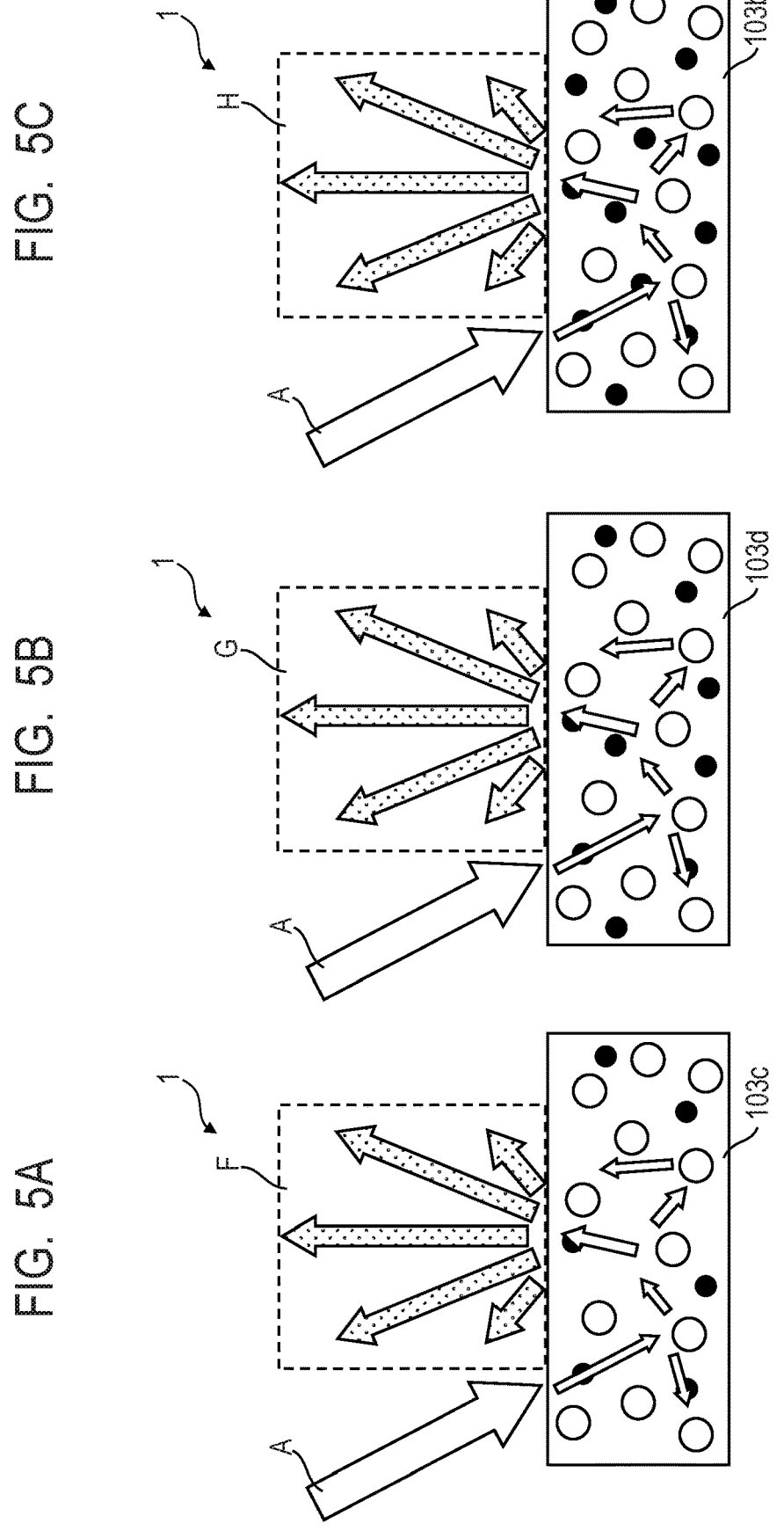
FIG. 5A is a schematic view illustrating a state in which light is reflected by an object in the optical apparatus according to the first embodiment.
FIG. 5B is a schematic view illustrating a state in which light is reflected by an object in the optical apparatus according to the first embodiment.
FIG. 5C is a schematic view illustrating a state in which light is reflected by an object in the optical apparatus according to the first embodiment.

FIGS. 5A, 5B and 5C show a schematic view illustrating a state in which the light A reflected by the first reflecting surface 101 is incident on the objects 103c, 103d and 103b in the optical apparatus 1 according to the present embodiment, respectively.

As shown in FIGS. 5A to 5C, each of the objects 103c, 103d and 103b has a different content of the impurity 1032.

Specifically, the content of the impurity 1032 in the object 103c is 1% with respect to the main substance 1031, the content of the impurity 1032 in the object 103d is 2% with respect to the main substance, and the content of the impurity 1032 in the object 103b is 3% with respect to the main substance 1031.

Then, as shown in FIG. 5A, when the light A reflected by the first reflecting surface 101 is incident on the object 103c, the light A interacts with the impurity 1032 to be partially absorbed, and then light F is diffusely reflected from a surface of the object 103c.

Further, as shown in FIG. 5B, when the light A reflected by the first reflecting surface 101 is incident on the object 103d, the light A interacts with the impurity 1032 to be partially absorbed, and then light G is diffusely reflected from a surface of the object 103d.

Furthermore, as shown in FIG. 5C, when the light A reflected by the first reflecting surface 101 is incident on the object 103b, the light A interacts with the impurity 1032 to be partially absorbed, and then light H is diffusely reflected from a surface of the object 103b.

That is, the light H is identical to the light C shown in (a) of FIG. 3.

Figure 6A:
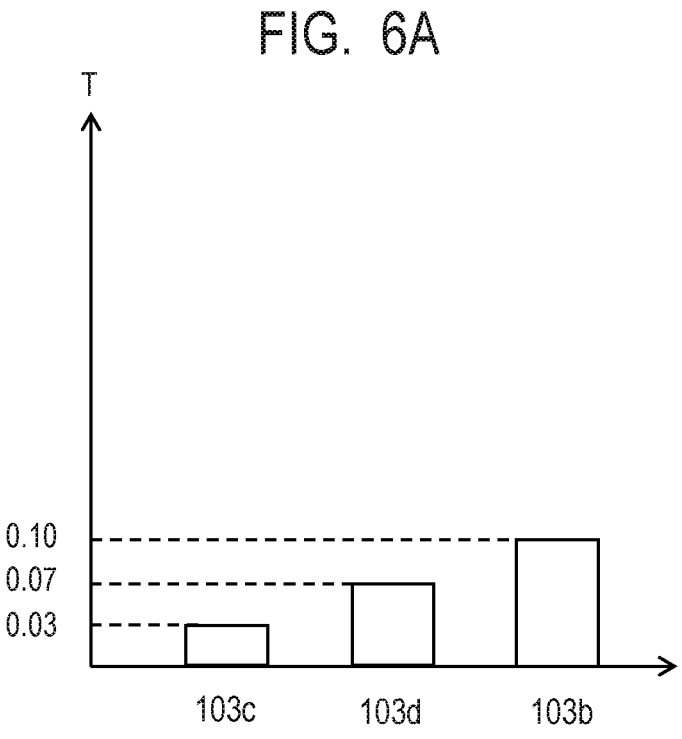
FIG. 6A is a graph in which detected amounts are compared with each other in the optical apparatus according to the first embodiment.

FIG. 6A shows a graph in which detected amounts T relating to the contents of the impurity 1032 in the objects 103*c*, 103*d* and 103*b* shown in FIGS. 5A to 5C are compared with each other.

Here, the detected amount T relating to the content of the impurity 1032 is defined by a difference between the relative light amount RI (=1) of the light B reflected from the surface of the object 103*a* not containing the impurity 1032 shown in FIG. 2A and the relative light amount RI of the light reflected from the surface of the corresponding object, namely as shown in the following expression (1):

$$T = 1 - RI \qquad (1).$$

First, since the relative light amount RI of the light H (i.e., the light C) reflected from the surface of the object 103*b* in which the content of the impurity 1032 is 3% is 0.90 as shown in FIG. 4, the detected amount T when the light receiving element 104 receives the light H is obtained as 0.10 from the expression (1).

Further, the detected amount T when the light receiving element 104 receives the light F reflected from the surface of the object 103*c* in which the content of the impurity 1032 is 1% is obtained as 0.10×(⅓)=0.03.

Furthermore, the detected amount T when the light receiving element 104 receives the light G reflected from the surface of the object 103*d* in which the content of the impurity 1032 is 2% is obtained as 0.10×(⅔)=0.07.

That is, when the light incident on each of the objects 103*c*, 103*d* and 103*b* interacts with the impurity 1032 once, the detected amounts T as shown in FIG. 6A are obtained.

Next, a case is considered in which the light which has already interacted twice with the impurity 1032 contained in each of the objects 103*c*, 103*d* and 103*b* is incident again on the object, as shown in (c) of FIG. 3.

In this case, the light H reflected from the surface of the object 103*b* in which the content of the impurity 1032 is 3% is identical to the light E shown in (c) of FIG. 3.

Since the relative light amount RI of the light E is 0.73 as shown in FIG. 4, the detected amount T when the light receiving element 104 receives the light H is obtained as 0.27 from the expression (1).

Further, the detected amount T when the light receiving element 104 receives the light F reflected from the surface of the object 103*c* in which the content of the impurity 1032 is 1% is obtained as 0.27×(⅓)=0.09.

Furthermore, the detected amount T when the light receiving element 104 receives the light G reflected from the surface of the object 103*d* in which the content of the impurity 1032 is 2% is obtained as 0.27×(⅔)=0.18.

Figure 6B:
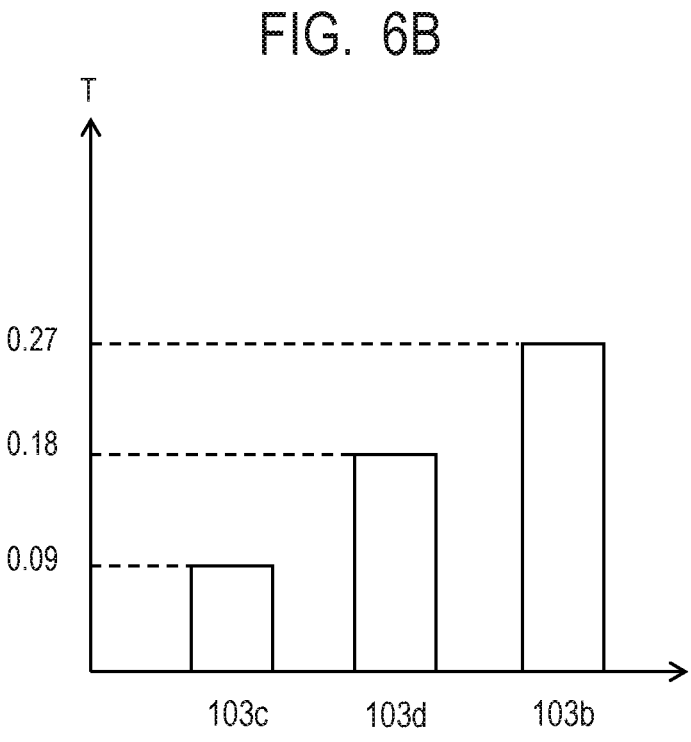
FIG. 6B is a graph in which detected amounts are compared with each other in the optical apparatus according to the first embodiment.

FIG. 6B shows a graph in which the detected amounts T relating to the contents of the impurity 1032 in such case are compared with each other.

As shown in FIGS. 6A and 6B, the detected amount T can be increased by increasing the number of interactions between the light and the impurity 1032 inside the object 103.

Then, it is possible to accurately determine the content of the impurity 1032 in the object 103 by increasing the detected amount T.

As described above, in the optical apparatus 1 according to the present embodiment, it is possible to efficiently irradiate the object 103 with light from the light source 100 by providing the first reflecting surface 101 and the second reflecting surface 102.

Further, it is possible to illuminate the object 103 a plurality of times by reflecting the light from the object 103 by the second reflecting surface 102. Thereby, the number of interactions between the light and the main substance 1031 or the impurity 1032 included in the object 103 can be increased.

Second Embodiment

Figure 7A:
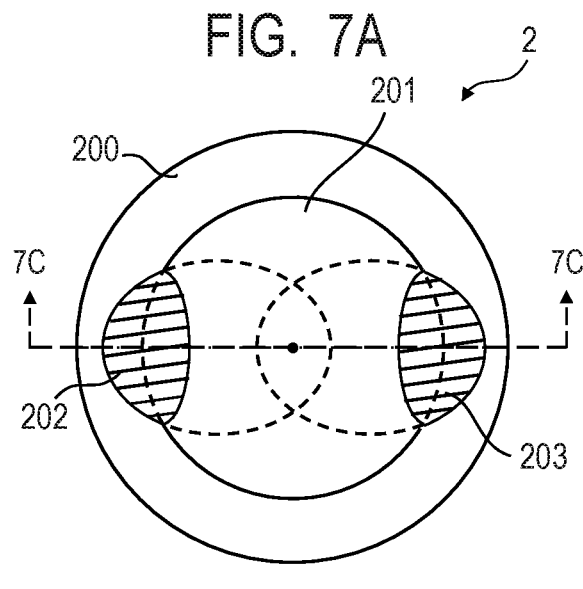
FIG. 7A is a partial projection view of an optical apparatus according to a second embodiment of the disclosure.
Figure 7B:
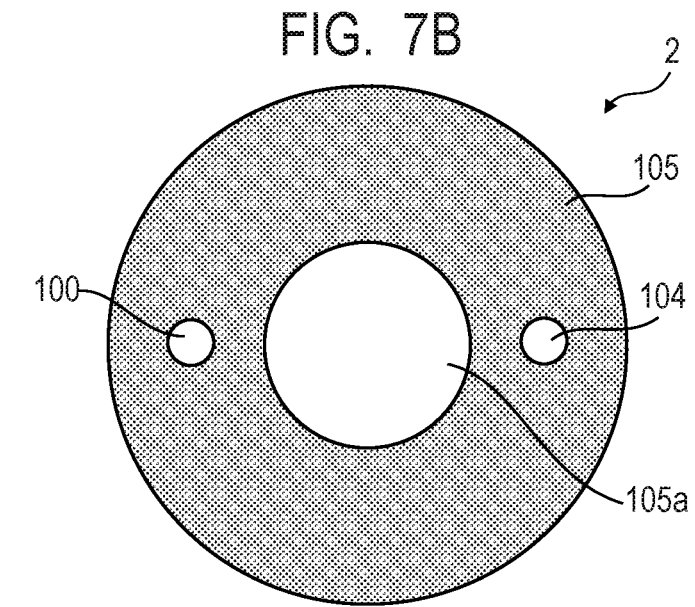
FIG. 7B is a partial top view of the optical apparatus according to the second embodiment.

FIGS. 7A and 7B show a partial projection view and a partial top view of an optical apparatus 2 according to a second embodiment of the disclosure, respectively.

Figure 7C:
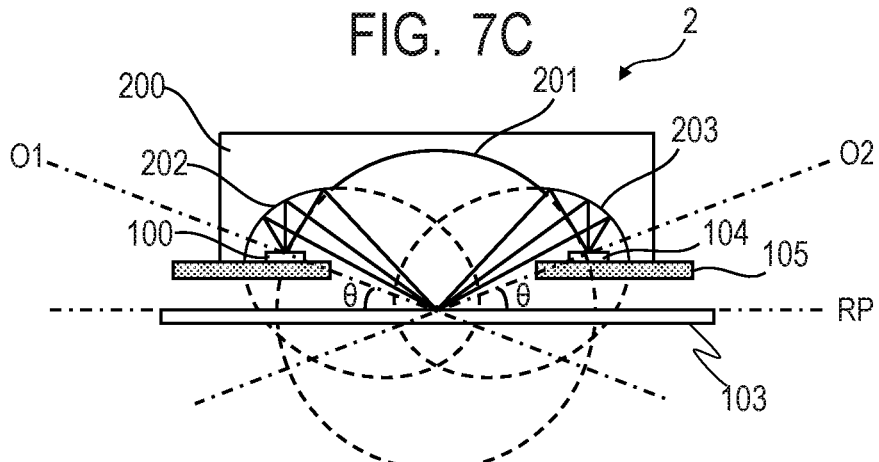
FIG. 7C is a cross-sectional view taken along a line 7C-7C of the optical apparatus according to the second embodiment.

Further, FIG. 7C shows a cross-sectional view of the optical apparatus 2 according to the second embodiment taken along a line 7C-7C in FIG. 7A.

The optical apparatus 2 according to the present embodiment includes a light source 100, a reflecting element 200 and a substrate 105.

The light source 100 is a light emitting unit such as a light emitting diode (LED), and is configured to emit light toward the first reflecting surface 202.

As the light source 100, a light emitting element or a light emitting device such as a laser light source or a spectral light source may be used instead of the light emitting diode.

The light receiving element 104 is a light receiving unit such as a photodiode (PD), and is configured to receive a part of light reflected by the third reflecting surface 203.

The substrate 105 is a member configured to hold the light source 100 and the light receiving element 104, and has an opening 105*a* (a first opening) formed therein.

The reflecting element 200 has a function of reflecting the light from the light source 100 and light from the object 103, and a resin is used as a material thereof.

As the material of the reflecting element 200, various materials such as a metal may be used instead of the resin.

Further, in the optical apparatus 2 according to the present embodiment, a second reflecting surface 201, a first reflecting surface 202 and a third reflecting surface 203 any of which is a mirror surface subjected to a metal vapor deposition and which are connected to each other are formed in the reflecting element 200.

The second reflecting surface 201, the first reflecting surface 202 and the third reflecting surface 203 may be provided with various reflecting means such as a total reflection or a glossy coating instead of the metal vapor deposition.

Each of the second reflecting surface 201, the first reflecting surface 202 and the third reflecting surface 203 has a curved surface defined by the following expression (2) when an intersection point with the optical axis is defined as an origin, an axis parallel to the optical axis is defined as an X axis, and a cross section perpendicular to the optical axis is defined as a YZ cross section:

$$X = \frac{\frac{h^2}{R}}{1 + \sqrt{1 - (1 + K)\left(\frac{h}{R}\right)^2}} \qquad (2)$$

where $h = \sqrt{Y^2 + Z^2}$.

In the expression (2), R is a curvature radius, and K is a conic coefficient.

Each of the first reflecting surface 202 and the third reflecting surface 203 is an aspherical surface which satisfies a condition of $-1.0 \leq K < 0.0$ with respect to the conic coefficient K, as indicated by a hatched portion in FIG. 7A.

Specifically, each of the first reflecting surface 202 and the third reflecting surface 203 is a part of a spheroidal surface having the curvature radius R of 7.5 mm and the conic coefficient K of −0.444.

An optical axis O1 passing through (including) a surface vertex at the light source 100 side and a focal point of the spheroidal surface forming the first reflecting surface 202 is inclined by θ=20.964° with respect to a reference plane RP.

Further, an optical axis O2 passing through (including) a surface vertex at the light receiving element 104 side and a focal point of the spheroidal surface forming the third reflecting surface 203 is inclined by θ=20.964° with respect to the reference plane RP.

In other words, the optical axes O1 and O2 are non-parallel to a surface of the substrate 105 (a substrate surface).

Here, the optical axis O1 is parallel to a major axis of the spheroidal surface forming the first reflecting surface 202, and the optical axis O2 is parallel to a major axis of the spheroidal surface forming the third reflecting surface 203.

Further, the second reflecting surface 201 is a part of a spherical surface having a curvature radius R of 18 mm and a conic coefficient K of 0.

That is, the first reflecting surface 202 and the second reflecting surface 201 have different shapes. Specifically, the first reflecting surface 202 and the second reflecting surface 201 have different curvatures.

As shown in FIG. 7C, the light source 100 is arranged so as to include one focal point (a first focal point) of the first reflecting surface 202.

Further, the light receiving element 104 is arranged so as to include one focal point (a first focal point) of the third reflecting surface 203.

In addition, the second reflecting surface 201, the first reflecting surface 202 and the third reflecting surface 203 are formed in the reflecting element 200 such that the other focal point (a second focal point) of each of the first reflecting surface 202 and the third reflecting surface 203 is arranged in the vicinity of a center of the second reflecting surface 201.

Note that the other focal point of each of the first reflecting surface 202 and the third reflecting surface 203 is arranged at the same position as the center of the second reflecting surface 201.

Then, the object 103 is arranged so as to include at least one of the other focal points of the first reflecting surface 202 and the third reflecting surface 203.

As shown in FIG. 7C, a part of light emitted from the light source 100 is incident on the first reflecting surface 202 in the optical apparatus 2 according to the present embodiment.

Then, the light reflected by the first reflecting surface 202 toward the object 103 is reflected by the object 103, and then a part of the light is incident on the second reflecting surface 201 or the third reflecting surface 203.

Next, the light incident on the second reflecting surface 201 is reflected by the second reflecting surface 201 to be incident on the object 103 again.

Then, a part of the light reflected again by the object 103 is incident on the second reflecting surface 201 or the third reflecting surface 203.

A part of the light reflected by the third reflecting surface 203 is incident on the light receiving element 104.

That is, in the optical apparatus 2 according to the present embodiment, the first reflecting surface 202 is defined as a reflecting region configured to reflect light from the light source 100 toward the object 103, and the second reflecting surface 201 is defined as a reflecting region configured to reflect a part of light from the object 103 toward the object 103.

Further, the third reflecting surface 203 is defined as a reflecting region configured to reflect a part of the light from the object 103 toward the light receiving element 104.

Figure 8:
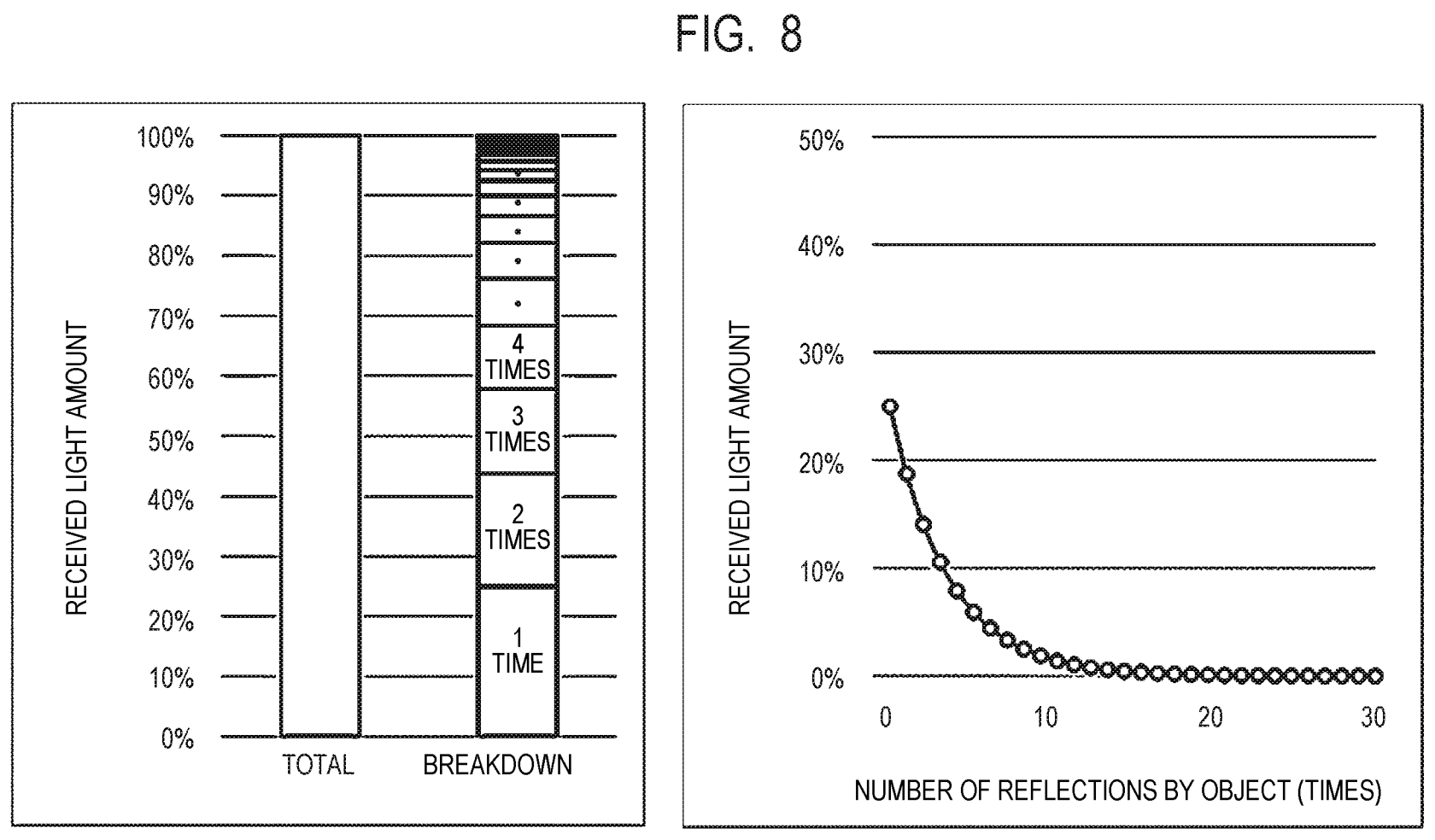

FIG. 8 shows a graph illustrating a breakdown in a received light amount of light received by the light receiving element 104 in accordance with the number of reflections by the object 103 in the optical apparatus 2 according to the present embodiment.

Here, a total amount of the received light amount of the light received by the light receiving element 104 is set to 100%.

As shown in FIG. 8, it can be seen that light which has reciprocated ten times or more between the object 103 and the second reflecting surface 201, namely the light which has been reflected ten times or more by the object 103, is included in the received light amount, in the optical apparatus 2 according to the present embodiment.

In other words, it is possible to guide light which has reciprocated ten times or more between the object 103 and the second reflecting surface 201, namely the light which has been reflected ten times or more by the object 103, to the light receiving element 104 by employing the above-described structure in the optical apparatus 2 according to the present embodiment.

Thereby, it is possible to further increase the detected amount T relating to the content of the impurity 1032 in the object 103 as described using FIGS. 6A and 6B by increasing the number of reflections by the object 103, as compared with the optical apparatus 1 according to the first embodiment.

By further increasing the detected amount T, the content of the impurity 1032 in the object 103 can be determined with a higher accuracy.

As described above, in the optical apparatus 2 according to the present embodiment, it is possible to efficiently irradiate the object 103 with light from the light source 100 by providing the first reflecting surface 202 and the second reflecting surface 201.

In addition, it is possible to efficiently illuminate the object 103 arranged outside the reflecting element 200.

By employing the above-described structure, it is possible to further increase the number of times that light reciprocates between the object 103 and the second reflecting surface 201, namely the number of times that the light is reflected by the object 103.

Third Embodiment

Figure 9A:
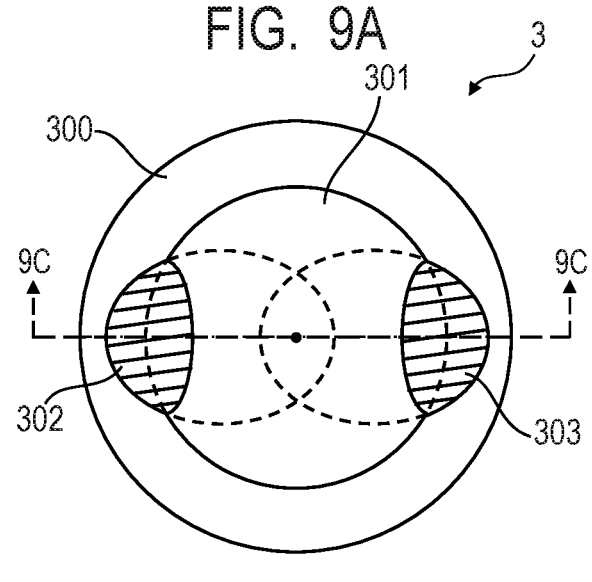
FIG. 9A is a partial projection view of an optical apparatus according to a third embodiment of the disclosure.
Figure 9B:
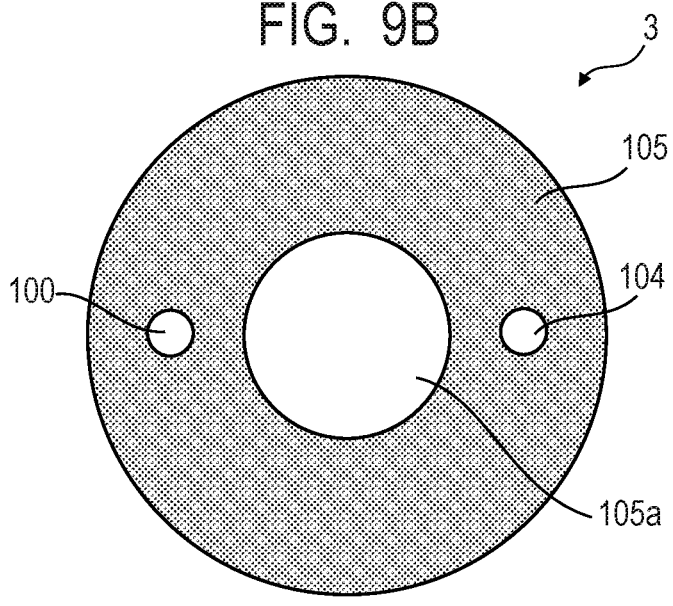
FIG. 9B is a partial top view of the optical apparatus according to the third embodiment.

FIGS. 9A and 9B show a partial projection view and a partial top view of an optical apparatus 3 according to a third embodiment of the disclosure, respectively.

Figure 9C:
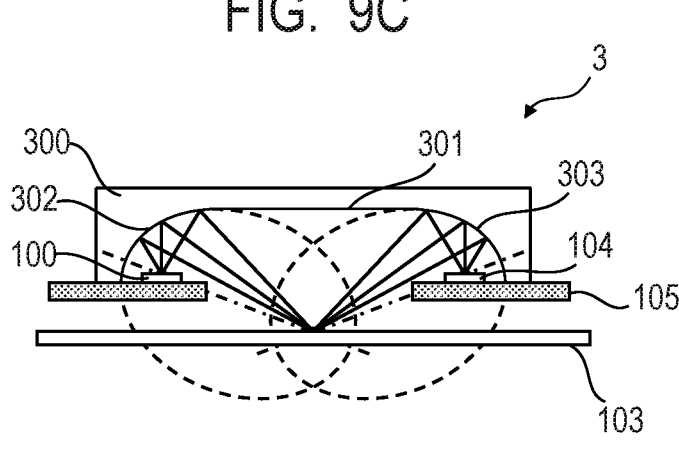
FIG. 9C is a cross-sectional view taken along a line 9C-9C of the optical apparatus according to the third embodiment.

Further, FIG. 9C shows a cross-sectional view of the optical apparatus 3 according to the third embodiment taken along a line 9C-9C in FIG. 9A.

Note that the optical apparatus 3 according to the present embodiment has the same structure as the optical apparatus 2 according to the second embodiment except that a reflecting element 300 is provided instead of the reflecting element 200, so that the same members are denoted by the same reference numerals, and description thereof is omitted.

The optical apparatus 3 according to the present embodiment includes a light source 100, a reflecting element 300 and a substrate 105.

The reflecting element 300 has a function of reflecting light emitted from the light source 100 and light reflected by the object 103, and a resin is used as a material thereof.

As the material of the reflecting element 300, various materials such as a metal may be used instead of the resin.

In the optical apparatus 3 according to the present embodiment, a second reflecting surface 301, a first reflecting surface 302 and a third reflecting surface 303 any of which is a mirror surface subjected to a metal vapor deposition are formed in the reflecting element 300.

The second reflecting surface 301, the first reflecting surface 302 and the third reflecting surface 303 may be provided with various reflecting means such as a total reflection or a glossy coating instead of the metal vapor deposition.

Each of the first reflecting surface 302 and the third reflecting surface 303 has a curved surface defined by the expression (2) described above when an intersection point with the optical axis is defined as an origin, an axis parallel to the optical axis is defined as an X axis, and a cross section perpendicular to the optical axis is defined as a YZ cross section.

Specifically, each of the first reflecting surface 302 and the third reflecting surface 303 is an aspherical surface having a conic coefficient K in a range of $-1.0 \leq K < 0.0$, as indicated by a hatched portion in FIG. 9A.

More specifically, each of the first reflecting surface 302 and the third reflecting surface 303 is a part of a spheroidal surface having a curvature radius R of 7.5 mm and the conic coefficient K of $-0.444$.

Further, an optical axis passing through a surface vertex and a focal point of each of the first reflecting surface 302 and the third reflecting surface 303 is inclined by 20.964° with respect to a reference plane.

The second reflecting surface 301 has a retroreflecting function, namely is a retroreflecting surface, and specifically has a shape in which a large number of fine corner cubes are arranged.

As the second reflecting surface 301, a retroreflecting surface with various shapes having a retroreflective function, in which a large number of fine spherical bodies are arranged, may be used instead of the large number of fine corner cubes.

As shown in FIG. 9C, the light source 100 is arranged so as to include one focal point of the first reflecting surface 302.

Further, the light receiving element 104 is arranged so as to include one focal point of the third reflecting surface 303.

Furthermore, the first reflecting surface 302 and the third reflecting surface 303 are formed in the reflecting element 300 such that the other focal point of each of the first reflecting surface 302 and the third reflecting surface 303 are arranged close to each other.

Then, the object 103 is arranged so as to include at least one of the other focal points of the first reflecting surface 302 and the third reflecting surface 303.

As shown in FIG. 9C, a part of light emitted from the light source 100 is incident on the first reflecting surface 302 in the optical apparatus 3 according to the present embodiment.

Then, the light reflected by the first reflecting surface 302 toward the object 103 is reflected by the object 103, and then a part of the light is incident on the second reflecting surface 301 or the third reflecting surface 303.

Next, the light incident on the second reflecting surface 301 is retroreflected by the second reflecting surface 301 to be incident on the object 103 again.

Then, a part of the light reflected again by the object 103 is incident on the second reflecting surface 301 or the third reflecting surface 303.

A part of the light reflected by the third reflecting surface 303 is incident on the light receiving element 104.

In the optical apparatus 3 according to the present embodiment, it is possible to guide light which has reciprocated ten times or more between the object 103 and the second reflecting surface 301, namely the light which has been reflected ten times or more by the object 103, to the light receiving element 104 by employing the above-described structure.

Thereby, it is possible to further increase the detected amount T relating to the content of the impurity 1032 in the object 103 as described using FIGS. 6A and 6B by increasing the number of reflections by the object 103, as compared with the optical apparatus 1 according to the first embodiment.

By further increasing the detected amount T, the content of the impurity 1032 in the object 103 can be determined with a higher accuracy.

As described above, in the optical apparatus 3 according to the present embodiment, it is possible to efficiently irradiate the object 103 with light from the light source 100 by providing the first reflecting surface 302 and the second reflecting surface 301.

Further, it is possible to efficiently illuminate the object 103 arranged outside the reflecting element 300.

In addition, a thickness of the reflecting element 300 can be made thinner than that of the optical apparatus 2 according to the second embodiment by forming the second reflecting surface 301 so as to have a retroreflecting function.

Fourth Embodiment

Figures 10A, 10B, 10C:
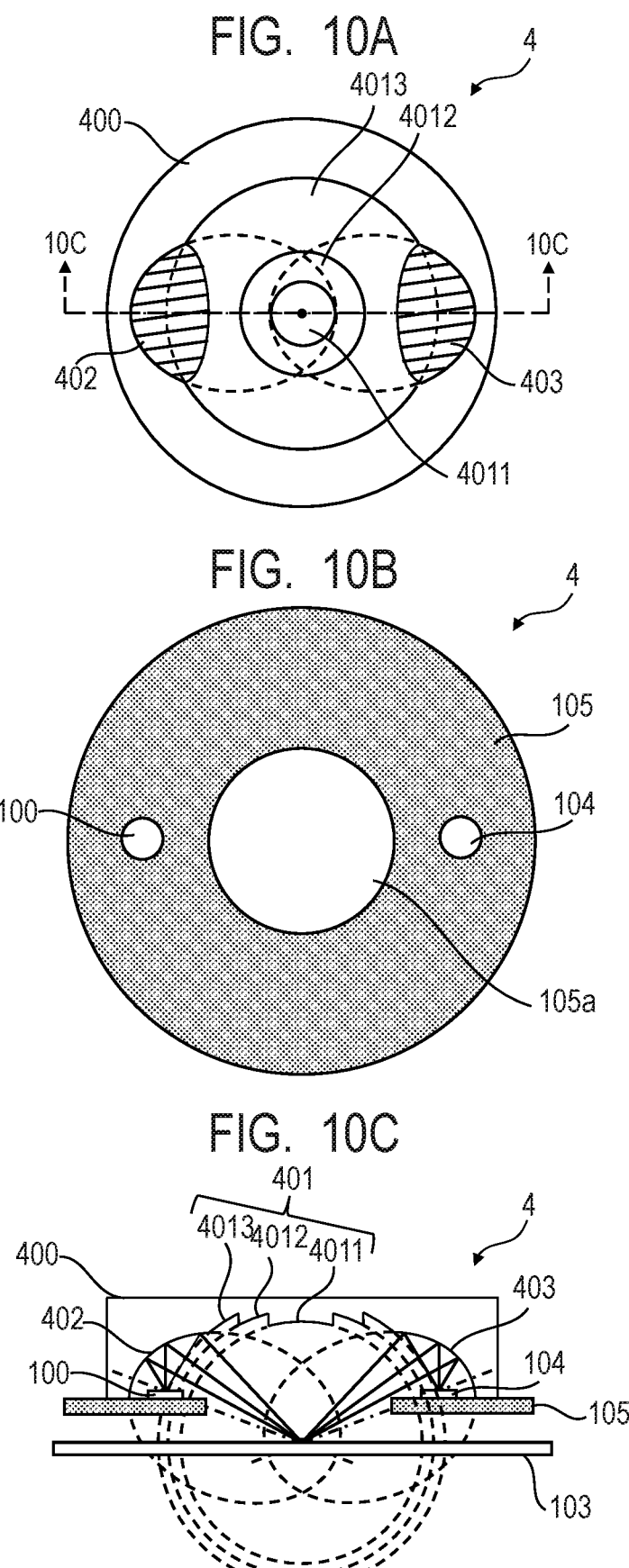
FIG. 10A is a partial projection view of an optical apparatus according to a fourth embodiment of the disclosure.
FIG. 10B is a partial top view of the optical apparatus according to the fourth embodiment.
FIG. 10C is a cross-sectional view taken along a line 10C-10C of the optical apparatus according to the fourth embodiment.

FIGS. 10A and 10B show a partial projection view and a partial top view of an optical apparatus 4 according to a fourth embodiment of the disclosure, respectively.

Further, FIG. 10C shows a cross-sectional view of the optical apparatus 4 according to the fourth embodiment taken along a line 10C-10C in FIG. 10A.

Note that the optical apparatus 4 according to the present embodiment has the same structure as that of the optical apparatus 2 according to the second embodiment except that a reflecting element 400 is provided instead of the reflecting element 200, so that the same members are denoted by the same reference numerals, and description thereof is omitted.

The optical apparatus 4 according to the present embodiment includes a light source 100, a reflecting element 400 and a substrate 105.

The reflecting element 400 has a function of reflecting light emitted from the light source 100 and light reflected by the object 103, and a resin is used as a material thereof.

As the material of the reflecting element 400, various materials such as a metal may be used instead of the resin.

Further, in the optical apparatus 4 according to the present embodiment, a second reflecting surface 401, a first reflecting surface 402 and a third reflecting surface 403 any of which is a mirror surface subjected to a metal vapor deposition are formed in the reflecting element 400.

The second reflecting surface 401, the first reflecting surface 402 and the third reflecting surface 403 may be provided with various reflecting means such as a total reflection or a glossy coating instead of the metal vapor deposition.

Each of the first reflecting surface 402 and the third reflecting surface 403 has a curved surface defined by the expression (2) described above when an intersection point with the optical axis is defined as an origin, an axis parallel to the optical axis is defined as an X axis, and a cross section perpendicular to the optical axis is defined as a YZ cross section.

Specifically, each of the first reflecting surface 402 and the third reflecting surface 403 is an aspherical surface having a conic coefficient K in a range of −1.0≤K<0.0, as indicated by a hatched portion in FIG. 10A.

More specifically, each of the first reflecting surface 402 and the third reflecting surface 403 is a part of a spheroidal surface having a curvature radius R of 7.5 mm and the conic coefficient K of −0.444.

Further, an optical axis passing through a surface vertex and a focal point of each of the first reflecting surface 402 and the third reflecting surface 403 is inclined by 20.964° with respect to a reference plane.

The second reflecting surface 401 is formed by a first partial reflecting surface 4011, a second partial reflecting surface 4012 and a third partial reflecting surface 4013.

The first partial reflecting surface 4011 is a part of a spherical surface having the curvature radius R of 15 mm and the conic coefficient K of 0.

Further, the second partial reflecting surface 4012 is a part of a spherical surface having the curvature radius R of 16.5 mm and the conic coefficient K of 0.

Furthermore, the third partial reflecting surface 4013 is a part of a spherical surface having the curvature radius R of 18 mm and the conic coefficient K of 0.

Centers of the first partial reflecting surface 4011, the second partial reflecting surface 4012 and the third partial reflecting surface 4013 are arranged at the same position.

As shown in FIG. 10C, the light source 100 is arranged so as to include one focal point of the first reflecting surface 402.

The light receiving element 104 is arranged so as to include one focal point of the third reflecting surface 403.

Further, the second reflecting surface 401, the first reflecting surface 402 and the third reflecting surface 403 are formed in the reflecting element 400 such that the other focal point of each of the first reflecting surface 402 and the third reflecting surface 403 is arranged in the vicinity of the center of the second reflecting surface 401, namely in the vicinity of the center of each of the first partial reflecting surface 4011, the second partial reflecting surface 4012 and the third partial reflecting surface 4013.

Then, the object 103 is arranged so as to include at least one of the other focal points of the first reflecting surface 402 and the third reflecting surface 403.

As shown in FIG. 10C, a part of light emitted from the light source 100 is incident on the first reflecting surface 402 in the optical apparatus 4 according to the present embodiment.

Then, the light reflected by the first reflecting surface 402 toward the object 103 is reflected by the object 103, and then a part of the light is incident on the second reflecting surface 401 or the third reflecting surface 403.

Next, the light incident on the second reflecting surface 401 is reflected by the second reflecting surface 401 to be incident on the object 103 again.

Then, a part of the light reflected again by the object 103 is incident on the second reflecting surface 401 or the third reflecting surface 403.

A part of the light reflected by the third reflecting surface 403 is incident on the light receiving element 104.

In the optical apparatus 4 according to the present embodiment, it is possible to guide light which has reciprocated ten times or more between the object 103 and the second reflecting surface 401, namely the light which has been reflected ten times or more by the object 103, to the light receiving element 104 by employing the above-described structure.

Thereby, it is possible to further increase the detected amount T relating to the content of the impurity 1032 in the object 103 as described using FIGS. 6A and 6B by increasing the number of reflections by the object 103, as compared with the optical apparatus 1 according to the first embodiment.

By further increasing the detected amount T, the content of the impurity 1032 in the object 103 can be determined with a higher accuracy.

As described above, in the optical apparatus 4 according to the present embodiment, it is possible to efficiently irradiate the object 103 with light from the light source 100 by providing the first reflecting surface 402 and the second reflecting surface 401.

Further, it is possible to efficiently illuminate the object 103 arranged outside the reflecting element 400.

In addition, a thickness of the reflecting element 400 can be made thinner than that of the optical apparatus 2 according to the second embodiment by providing the first partial reflecting surface 4011, the second partial reflecting surface 4012 and the third partial reflecting surface 4013 which are parts of spherical surfaces having different curvature radii R from each other as the second reflecting surface 401.

Note that an effect equivalent to that of the optical apparatus 4 according to the present embodiment can be obtained if the curvature radii R of the first partial reflecting surface 4011, the second partial reflecting surface 4012 and the third partial reflecting surface 4013 are made equal to each other, namely the second reflecting surface 401 is designed in the shape of a Fresnel surface.

Fifth Embodiment

FIGS. 11A and 11B show a partial projection view and a partial top view of an optical apparatus 5 according to a fifth embodiment of the disclosure, respectively.

Further, FIGS. 11C, 11D and 11E show cross-sectional views of the optical apparatus 5 according to the fifth embodiment taken along a 11C-11C line, a 11D-11D line and a 11E-11E line in FIG. 11A, respectively.

The optical apparatus 5 according to the present embodiment includes a first light source 1001, a second light source 1002, a reflecting element 500 and a substrate 1005.

Each of the first light source 1001 and the second light source 1002 is a light emitting unit such as a light emitting diode (LED). As the first light source 1001 and the second light source 1002, a light emitting element or a light emitting device such as a laser light source or a spectral light source may be used instead of the light emitting diode.

The light receiving element 1003 is a light receiving unit such as a photodiode (PD).

The substrate 1005 is a member configured to hold the first light source 1001, the second light source 1002 and the light receiving element 1003, and has an opening 1005*a* formed therein.

The reflecting element 500 has a function of reflecting light from the first light source 1001 and the second light source 1002 and light from the object 103, and a resin is used as a material thereof.

As the material of the reflecting element 500, various materials such as a metal may be used instead of the resin.

In the optical apparatus 5 according to the present embodiment, a second reflecting surface 501, a first reflecting surface 502, a fourth reflecting surface 503 (a first reflecting surface) and a third reflecting surface 504 any of which is a mirror surface subjected to a metal vapor deposition are formed in the reflecting element 500.

The second reflecting surface 501, the first reflecting surface 502, the fourth reflecting surface 503 and the third reflecting surface 504 may be provided with various reflecting means such as a total reflection or a glossy coating instead of the metal vapor deposition.

Each of the second reflecting surface 501, the first reflecting surface 502, the fourth reflecting surface 503 and the third reflecting surface 504 has a curved surface defined by the expression (2) described above when an intersection point with the optical axis is defined as an origin, an axis parallel to the optical axis is defined as an X axis, and a cross section perpendicular to the optical axis is defined as a YZ cross section.

Each of the first reflecting surface 502, the fourth reflecting surface 503 and the third reflecting surface 504 is an aspherical surface having a conic coefficient K in a range of $-1.0 \leq K < 0.0$, as indicated by a hatched portion in FIG. 11A.

Specifically, each of the first reflecting surface 502, the fourth reflecting surface 503 and the third reflecting surface 504 is a part of a spheroidal surface having a curvature radius R of 7.5 mm and the conic coefficient K of −0.444.

Further, an optical axis passing through a surface vertex and a focal point of each of the first reflecting surface 502, the fourth reflecting surface 503 and the third reflecting surface 504 is inclined by 20.964° with respect to a reference plane.

Furthermore, the second reflecting surface 501 is a part of a spherical surface having the curvature radius R of 18 mm and the conic coefficient K of 0.

As shown in FIG. 11C, the first light source 1001 is arranged so as to include one focal point of the first reflecting surface 502.

Further, as shown in FIG. 11D, the second light source 1002 is arranged so as to include one focal point of the fourth reflecting surface 503.

Furthermore, as shown in FIG. 11E, the light receiving element 1003 is arranged so as to include one focal point of the third reflecting surface 504.

Then, the second reflecting surface 501, the first reflecting surface 502, the fourth reflecting surface 503 and the third reflecting surface 504 are formed in the reflecting element 500 such that the other focal point of each of the first reflecting surface 502, the fourth reflecting surface 503 and the third reflecting surface 504 is arranged in the vicinity of a center of the second reflecting surface 501.

The object 103 is arranged so as to include at least one of the other focal points of the first reflecting surface 502, the fourth reflecting surface 503 and the third reflecting surface 504.

As shown in FIG. 11C, a part of light emitted from the first light source 1001 is incident on the first reflecting surface 502 in the optical apparatus 5 according to the present embodiment.

Then, the light reflected by the first reflecting surface 502 toward the object 103 is reflected by the object 103, and then a part of the light is incident on the second reflecting surface 501 or the third reflecting surface 504.

Next, the light incident on the second reflecting surface 501 is reflected by the second reflecting surface 501 to be incident on the object 103 again.

Then, a part of the light reflected again by the object 103 is incident on the second reflecting surface 501 or the third reflecting surface 504.

A part of the light reflected by the third reflecting surface 504 is incident on the light receiving element 1003 as shown in FIG. 11E.

Further, as shown in FIG. 11D, a part of light emitted from the second light source 1002 is incident on the fourth reflecting surface 503 in the optical apparatus 5 according to the present embodiment.

Then, the light reflected by the fourth reflecting surface 503 toward the object 103 is reflected by the object 103, and then a part of the light is incident on the second reflecting surface 501 or the third reflecting surface 504.

Next, the light incident on the second reflecting surface 501 is reflected by the second reflecting surface 501 to be incident on the object 103 again.

Then, a part of the light reflected again by the object 103 is incident on the second reflecting surface 501 or the third reflecting surface 504.

A part of the light reflected by the third reflecting surface 504 is incident on the light receiving element 1003 as shown in FIG. 11E.

In the optical apparatus 5 according to the present embodiment, it is possible to guide light which has reciprocated ten times or more between the object 103 and the second reflecting surface 501, namely the light which has been reflected ten times or more by the object 103, to the light receiving element 1003 by employing the above-described structure.

Thereby, it is possible to further increase the detected amount T relating to the content of the impurity 1032 in the object 103 as described using FIGS. 6A and 6B by increasing the number of reflections by the object 103, as compared with the optical apparatus 1 according to the first embodiment.

By further increasing the detected amount T, the content of the impurity 1032 in the object 103 can be determined with a higher accuracy.

As described above, in the optical apparatus 5 according to the present embodiment, it is possible to efficiently irradiate the object 103 with light from the light source 100 by providing the first reflecting surface 502, the fourth reflecting surface 503 and the second reflecting surface 501.

Further, it is possible to efficiently illuminate the object 103 arranged outside the reflecting element 500.

In addition, in the optical apparatus 5 according to the present embodiment, it is possible to interact with various impurities 1032 in the object 103 by making wavelengths of light emitted from the first light source 1001 and the second light source 1002 different from each other.

In this case, a plurality of light receiving elements 1003 may be provided so as to be able to receive light of a plurality of wavelengths.

Further, it is also possible to select the wavelength of light to be received by providing a filter in the light receiving element 1003.

Sixth Embodiment

Figures 12A, 12B, 12C, 12D, 12E:
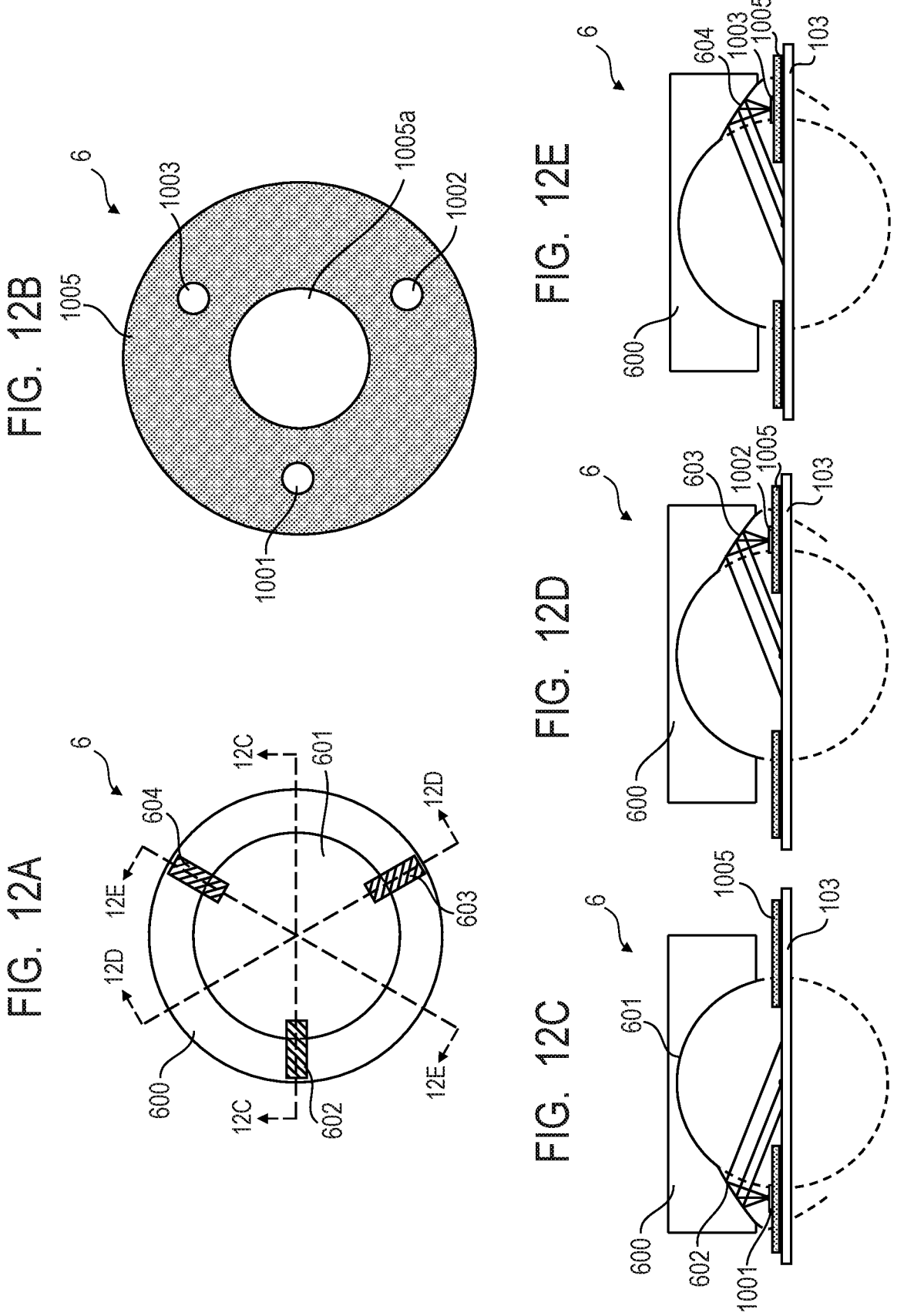
FIG. 12A is a partial projection view of an optical apparatus according to a sixth embodiment of the disclosure.
FIG. 12B is a partial top view of the optical apparatus according to the sixth embodiment.
FIG. 12C is a cross-sectional view taken along a line 12C-12C of the optical apparatus according to the sixth embodiment.
FIG. 12D is a cross-sectional view taken along a line 12D-12D of the optical apparatus according to the sixth embodiment.
FIG. 12E is a cross-sectional view taken along a line 12E-12E of the optical apparatus according to the sixth embodiment.

FIGS. 12A and 12B show a partial projection view and a partial top view of an optical apparatus 6 according to a sixth embodiment of the disclosure, respectively.

Further, FIGS. 12C, 12D and 12E show cross-sectional views of the optical apparatus 6 according to the sixth embodiment taken along a 12C-12C line, a 12D-12D line and a 12E-12E line in FIG. 12A, respectively.

Note that the optical apparatus 6 according to the present embodiment has the same structure as that of the optical apparatus 5 according to the fifth embodiment except that a reflecting element 600 is provided instead of the reflecting element 500, so that the same members are denoted by the same reference numerals, and description thereof is omitted.

The optical apparatus 6 according to the present embodiment includes a first light source 1001, a second light source 1002, a reflecting element 600 and a substrate 1005.

The reflecting element 600 has a function of reflecting light from the first light source 1001 and the second light source 1002 and light from the object 103, and a resin is used as a material thereof.

As the material of the reflecting element 600, various materials such as a metal may be used instead of the resin.

Further, in the optical apparatus 6 according to the present embodiment, a second reflecting surface 601, a first reflecting surface 602, a fourth reflecting surface 603 (a first reflecting surface) and a third reflecting surface 604 any of which is a mirror surface subjected to a metal vapor deposition are formed in the reflecting element 600.

The second reflecting surface 601, the first reflecting surface 602, the fourth reflecting surface 603 and the third reflecting surface 604 may be provided with various reflecting means such as a total reflection or a glossy coating instead of the metal vapor deposition.

Each of the second reflecting surface 601, the first reflecting surface 602, the fourth reflecting surface 603 and the third reflecting surface 604 has a curved surface defined by the expression (2) described above when an intersection point with the optical axis is defined as an origin, an axis parallel to the optical axis is defined as an X axis, and a cross section perpendicular to the optical axis is defined as a YZ cross section.

Then, each of the first reflecting surface 602, the fourth reflecting surface 603 and the third reflecting surface 604 is an aspherical surface having a conic coefficient K in a range of $-1.0 \leq K < 0.0$, as indicated by a hatched portion in FIG. 12A.

Specifically, each of the first reflecting surface 602, the fourth reflecting surface 603 and the third reflecting surface 604 is a part of a paraboloid-of-revolution (paraboloidal) surface having a curvature radius R of 9 mm and the conic coefficient K of −1.

Further, an optical axis passing through a surface vertex and a focal point of each of the first reflecting surface 602, the fourth reflecting surface 603 and the third reflecting surface 604 is inclined by 20° with respect to a reference plane.

Furthermore, the second reflecting surface 601 is a part of a spherical surface having the curvature radius R of 18 mm and the conic coefficient K of 0.

As shown in FIG. 12C, the first light source 1001 is arranged so as to include the focal point (a first focal point) of the first reflecting surface 602.

Further, as shown in FIG. 12D, the second light source 1002 is arranged so as to include the focal point (a first focal point) of the fourth reflecting surface 603.

Furthermore, as shown in FIG. 12E, the light receiving element 1003 is arranged so as to include the focal point of the third reflecting surface 604.

The object 103 is arranged so as to include the vicinity of a center of the second reflecting surface 601.

As shown in FIG. 12C, a part of light emitted from the first light source 1001 is incident on the first reflecting surface 602 in the optical apparatus 6 according to the present embodiment.

Then, the light reflected by the first reflecting surface 602 toward the object 103 is reflected by the object 103, and then a part of the light is incident on the second reflecting surface 601 or the third reflecting surface 604.

Next, the light incident on the second reflecting surface 601 is reflected by the second reflecting surface 601 to be incident on the object 103 again.

Then, a part of the light reflected again by the object 103 is incident on the second reflecting surface 601 or the third reflecting surface 604.

A part of the light reflected by the third reflecting surface 604 is incident on the light receiving element 1003 as shown in FIG. 12E.

Further, as shown in FIG. 12D, a part of light emitted from the second light source 1002 is incident on the fourth reflecting surface 603 in the optical apparatus 6 according to the present embodiment.

Then, the light reflected by the fourth reflecting surface 603 toward the object 103 is reflected by the object 103, and then a part of the light is incident on the second reflecting surface 601 or the third reflecting surface 604.

Next, the light incident on the second reflecting surface 601 is reflected by the second reflecting surface 601 to be incident on the object 103 again.

Then, a part of the light reflected again by the object 103 is incident on the second reflecting surface 601 or the third reflecting surface 604.

A part of the light reflected by the third reflecting surface 604 is incident on the light receiving element 1003 as shown in FIG. 12E.

In the optical apparatus 6 according to the present embodiment, it is possible to guide light which has reciprocated ten times or more between the object 103 and the second reflecting surface 601, namely the light which has been reflected ten times or more by the object 103, to the light receiving element 1003 by employing the above-described structure.

Thereby, it is possible to further increase the detected amount T relating to the content of the impurity 1032 in the object 103 as described using FIGS. 6A and 6B by increasing the number of reflections by the object 103, as compared with the optical apparatus 1 according to the first embodiment.

By further increasing the detected amount T, the content of the impurity 1032 in the object 103 can be determined with a higher accuracy.

As described above, in the optical apparatus 6 according to the present embodiment, it is possible to efficiently irradiate the object 103 with light from the light source 100 by providing the first reflecting surface 602, the fourth reflecting surface 603 and the second reflecting surface 601.

Further, it is possible to efficiently illuminate the object 103 arranged outside the reflecting element 600.

In addition, in the optical apparatus 6 according to the present embodiment, the object 103 can be uniformly illuminated by designing the first reflecting surface 602, the fourth reflecting surface 603 and the third reflecting surface 604 to be a part of a paraboloid-of-revolution (paraboloidal) surface.

Then, it is possible to reduce a change in a light amount of light received by the light receiving element 1003, namely in the detected amount T even when a position of the object 103 changes.

Seventh Embodiment

Figure 13A:
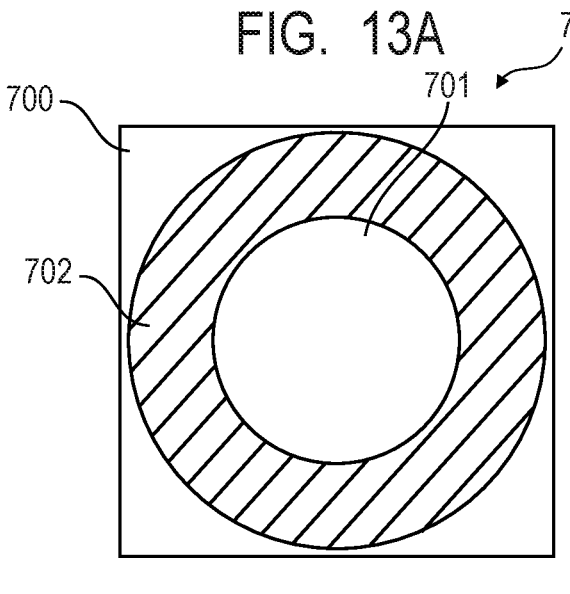
FIG. 13A is a partial projection view of an optical apparatus according to a seventh embodiment of the disclosure.
Figure 13B:
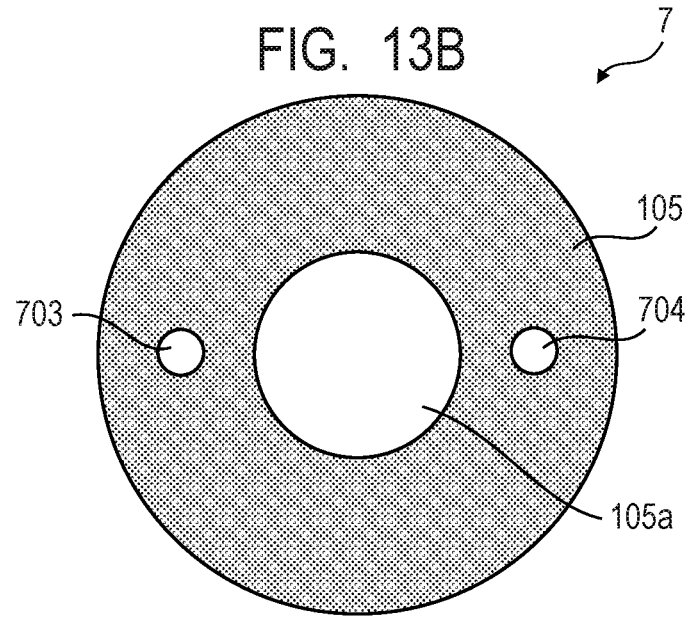
FIG. 13B is a partial top view of the optical apparatus according to the seventh embodiment.

FIGS. 13A and 13B show a partial projection view and a partial top view of an optical apparatus 7 according to a seventh embodiment of the disclosure, respectively.

Figure 13C:
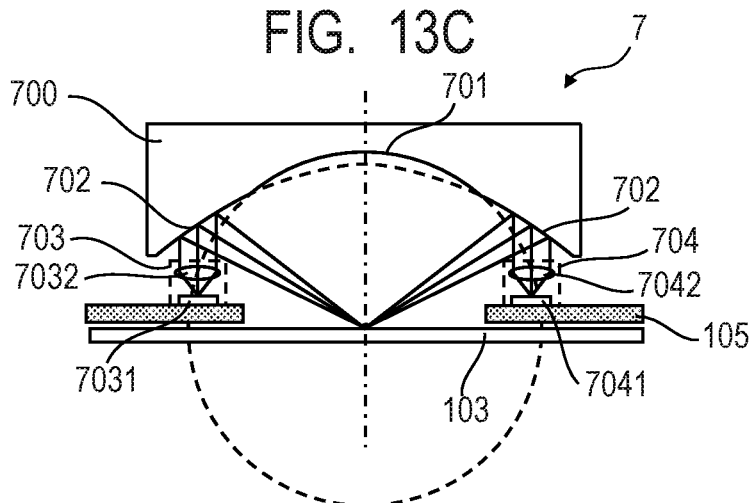
FIG. 13C is a cross-sectional view of the optical apparatus according to the seventh embodiment.

Further, FIG. 13C shows a cross-sectional view of the optical apparatus 7 according to the seventh embodiment taken along a cross section perpendicular to a reference plane.

The optical apparatus 7 according to the present embodiment includes a light source unit 703, a reflecting element 700 and a substrate 105.

The light source unit 703 includes a light source 7031 and an illumination lens 7032.

The light source 7031 is a light emitting unit such as a light emitting diode (LED). As the light source 7031, a light emitting element or a light emitting device such as a laser light source or a spectral light source may be used instead of the light emitting diode.

Further, the illumination lens 7032 performs a predetermined refractive action on the light emitted from the light source 7031.

A light receiving unit 704 includes a light receiving element 7041 and an imaging lens 7042.

The light receiving element 7041 is a light receiving unit such as a photodiode (PD).

The imaging lens 7042 condenses the incident light on the light receiving element 7041.

The substrate 105 is a member configured to hold the light source unit 703 and the light receiving unit 704, and has an opening 105a formed therein.

The reflecting element 700 has a function of reflecting light from the light source unit 703 and light from the object 103, and a resin is used as a material thereof.

As the material of the reflecting element 700, various materials such as a metal may be used instead of the resin.

In the optical apparatus 7 according to the present embodiment, a second reflecting surface 701 and a first reflecting surface 702 any of which is a mirror surface subjected to a metal vapor deposition are formed in the reflecting element 700.

The second reflecting surface 701 and the first reflecting surface 702 may be provided with various reflecting means such as a total reflection or a glossy coating instead of the metal vapor deposition.

As described below, in the optical apparatus 7 according to the present embodiment, the first reflecting surface 702 also serves as the third reflecting surface in the optical apparatuses according to the first to sixth embodiments.

Each of the second reflecting surface 701 and the first reflecting surface 702 has a curved surface defined by the expression (2) described above when an intersection point with the optical axis is defined as an origin, an axis parallel to the optical axis is defined as an X axis, and a cross section perpendicular to the optical axis is defined as a YZ cross section.

Then, the first reflecting surface 702 is an aspherical surface having a conic coefficient K in the range of $-1.0 \leq K < 0.0$, as indicated by a hatched portion in FIG. 13A.

Specifically, the first reflecting surface 702 is a part of a paraboloid-of-revolution (paraboloidal) surface having a curvature radius R of 28.8 mm and the conic coefficient K of −1.

Further, an optical axis passing through a surface vertex and a focal point of the first reflecting surface 702 is inclined by 90° with respect to the reference plane.

Furthermore, the second reflecting surface 701 is a part of a spherical surface having the curvature radius R of 18 mm and the conic coefficient K of 0.

As shown in FIG. 13C, the light source unit 703 is arranged such that light emitted from the light source 7031 is condensed in the vicinity of a center of the second reflecting surface 701 via the first reflecting surface 702.

Further, the light receiving unit 704 is arranged such that light (divergent light) from the vicinity of the center of the second reflecting surface 701 is condensed on the light receiving element 7041 via the first reflecting surface 702.

In the reflecting element 700, the second reflecting surface 701 and the first reflecting surface 702 are formed such that the center of the second reflecting surface 701 and the focal point of the first reflecting surface 702 are close to each other.

Then, the object 103 is arranged so as to include at least one of the center of the second reflecting surface 701 and the focal point of the first reflecting surface 702.

As shown in FIG. 13C, light emitted from the light source 7031 passes through the illumination lens 7032, and then is incident on the first reflecting surface 702 in the optical apparatus 7 according to the present embodiment.

Then, the light reflected by the first reflecting surface 702 toward the object 103 is reflected by the object 103, and then a part of the light is incident on the second reflecting surface 701 or the first reflecting surface 702.

Next, the light incident on the second reflecting surface 701 is reflected by the second reflecting surface 701 to be incident on the object 103 again.

Then, a part of the light reflected again by the object 103 is incident on the second reflecting surface 701 or the first reflecting surface 702.

A part of the light reflected by the first reflecting surface 702 passes through the imaging lens 7042, and then is incident on the light receiving element 7041.

In the optical apparatus 7 according to the present embodiment, it is possible to guide light which has reciprocated ten times or more between the object 103 and the second reflecting surface 701, namely the light which has been reflected ten times or more by the object 103, to the light receiving element 7041 by employing the above-described structure.

Thereby, it is possible to further increase the detected amount T relating to the content of the impurity 1032 in the object 103 as described using FIGS. 6A and 6B by increasing the number of reflections by the object 103, as compared with the optical apparatus 1 according to the first embodiment.

By further increasing the detected amount T, the content of the impurity 1032 in the object 103 can be determined with a higher accuracy.

As described above, in the optical apparatus 7 according to the present embodiment, it is possible to efficiently irradiate the object 103 with light from the light source 7031 by providing the first reflecting surface 702 and the second reflecting surface 701.

Further, it is possible to efficiently illuminate the object 103 arranged outside the reflecting element 700.

In addition, in the optical apparatus 7 according to the present embodiment, it is possible to increase a region (a reflecting region, an effective region) of the first reflecting surface 702 on which light is incident by designing the first reflecting surface 702 so as to be a part of a paraboloid-of-revolution (paraboloidal) surface and inclining the optical axis of the first reflecting surface 702 by 90° with respect to the reference surface.

Thereby, it is possible to expand a region in which the light source 7031 and the light receiving element 7041 can be arranged.

Eighth Embodiment

Figures 14A, 14B:
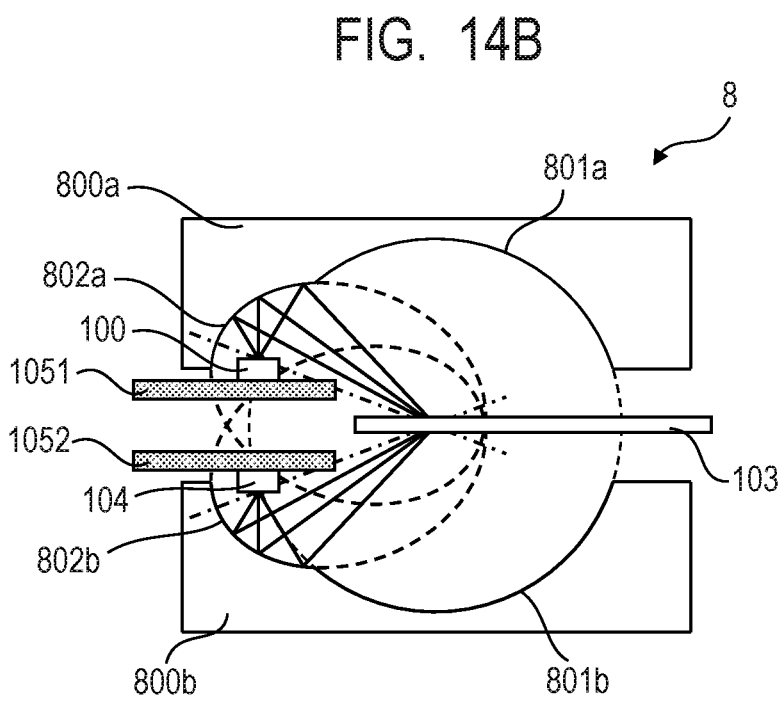
FIG. 14A is a partial projection view of an optical apparatus according to an eighth embodiment of the disclosure.
FIG. 14B is a cross-sectional view taken along a line 14B-14B of the optical apparatus according to the eighth embodiment.

FIG. 14A shows a partial projection view of an optical apparatus 8 according to an eighth embodiment of the disclosure.

Further, FIG. 14B shows a cross-sectional view of the optical apparatus 8 according to the eighth embodiment taken along a line 14B-14B in FIG. 14A.

The optical apparatus 8 according to the present embodiment includes a light source 100, a first reflecting element 800a, a second reflecting element 800b and a first substrate 1051.

The light source 100 is a light emitting unit such as a light emitting diode (LED). As the light source 100, a light emitting element or a light emitting device such as a laser light source or a spectral light source may be used instead of the light emitting diode.

The light receiving element 104 is a light receiving unit such as a photodiode (PD).

The first substrate 1051 and the second substrate 1052 are members configured to hold the light source 100 and the light receiving element 104, respectively.

The first reflecting element 800a has a function of reflecting light emitted from the light source 100 and light reflected by the object 103, and a resin is used as a material thereof.

Further, the second reflecting element 800b has a function of reflecting light passing through the object 103, and the resin is used as a material thereof.

As a material of each of the first reflecting element 800a and the second reflecting element 800b, various materials such as a metal may be used instead of the resin.

Further, in the optical apparatus 8 according to the present embodiment, a second reflecting surface 801a and a first reflecting surface 802a any of which is a mirror surface subjected to a metal vapor deposition are formed in the first reflecting element 800a.

Furthermore, a fourth reflecting surface 801b (a second reflecting surface) and a third reflecting surface 802b any of which is the mirror surface subjected to the metal vapor deposition are formed in the second reflecting element 800b.

The second reflecting surface 801a, the first reflecting surface 802a, the fourth reflecting surface 801b and the third reflecting surface 802b may be provided with various reflecting means such as a total reflection or a glossy coating instead of the metal vapor deposition.

Each of the second reflecting surface 801a, the first reflecting surface 802a, the fourth reflecting surface 801b and the third reflecting surface 802b has a curved surface defined by the expression (2) described above when an intersection point with the optical axis is defined as an origin, an axis parallel to the optical axis is defined as an X axis, and a cross section perpendicular to the optical axis is defined as a YZ cross section.

Each of the first reflecting surface 802a and the third reflecting surface 802b is an aspherical surface having a conic coefficient K in the range of $-1.0 \leq K < 0.0$, as indicated by a hatched portion in FIG. 14A.

Specifically, each of the first reflecting surface 802a and the third reflecting surface 802b is a part of a spheroidal surface having a curvature radius R of 7.5 mm and the conic coefficient K of −0.444.

Further, an optical axis passing through a surface vertex and a focal point of each of the first reflecting surface 802a and the third reflecting surface 802b is inclined by 20.964° with respect to a reference surface.

Furthermore, each of the second reflecting surface 801a and the fourth reflecting surface 801b is a part of a spherical surface having the curvature radius R of 18 mm and the conic coefficient K of 0.

As shown in FIG. 14B, the light source 100 is arranged so as to include one focal point of the first reflecting surface 802a.

Further, the light receiving element 104 is arranged so as to include one focal point of the third reflecting surface 802b.

Furthermore, the first reflecting surface 802a and the second reflecting surface 801a are formed in the first reflecting element 800a, and the third reflecting surface 802b and the fourth reflecting surface 801b are formed in the second reflecting element 800b such that the other focal points of the first reflecting surface 802a and the third reflecting surface 802b are arranged in the vicinity of centers of the second reflecting surface 801a and the fourth reflecting surface 801b, respectively.

The object 103 is arranged so as to include at least one of the other focal points of the first reflecting surface 802a and the third reflecting surface 802b.

As shown in FIG. 14B, a part of light emitted from the light source 100 is incident on the first reflecting surface 802a in the optical apparatus 8 according to the present embodiment.

Then, the light reflected by the first reflecting surface 802a toward the object 103 is reflected by the object 103 or passes through the object 103.

Next, a part of the light reflected by the object 103 is incident on the second reflecting surface 801a.

On the other hand, a part of the light which has passed through the object 103 is incident on the fourth reflecting surface 801b.

Next, the light incident on the second reflecting surface 801a is reflected by the second reflecting surface 801a to be incident on the object 103 again, and then reflected by the object 103 or pass through the object 103.

The light reflected by the fourth reflecting surface 801b toward the object 103 is reflected by the object 103 toward the fourth reflecting surface 801b or the third reflecting surface 802b or passes through the object 103.

Then, a part of the light reflected by the third reflecting surface 802b is incident on the light receiving element 104.

Figures 15A, 15B:
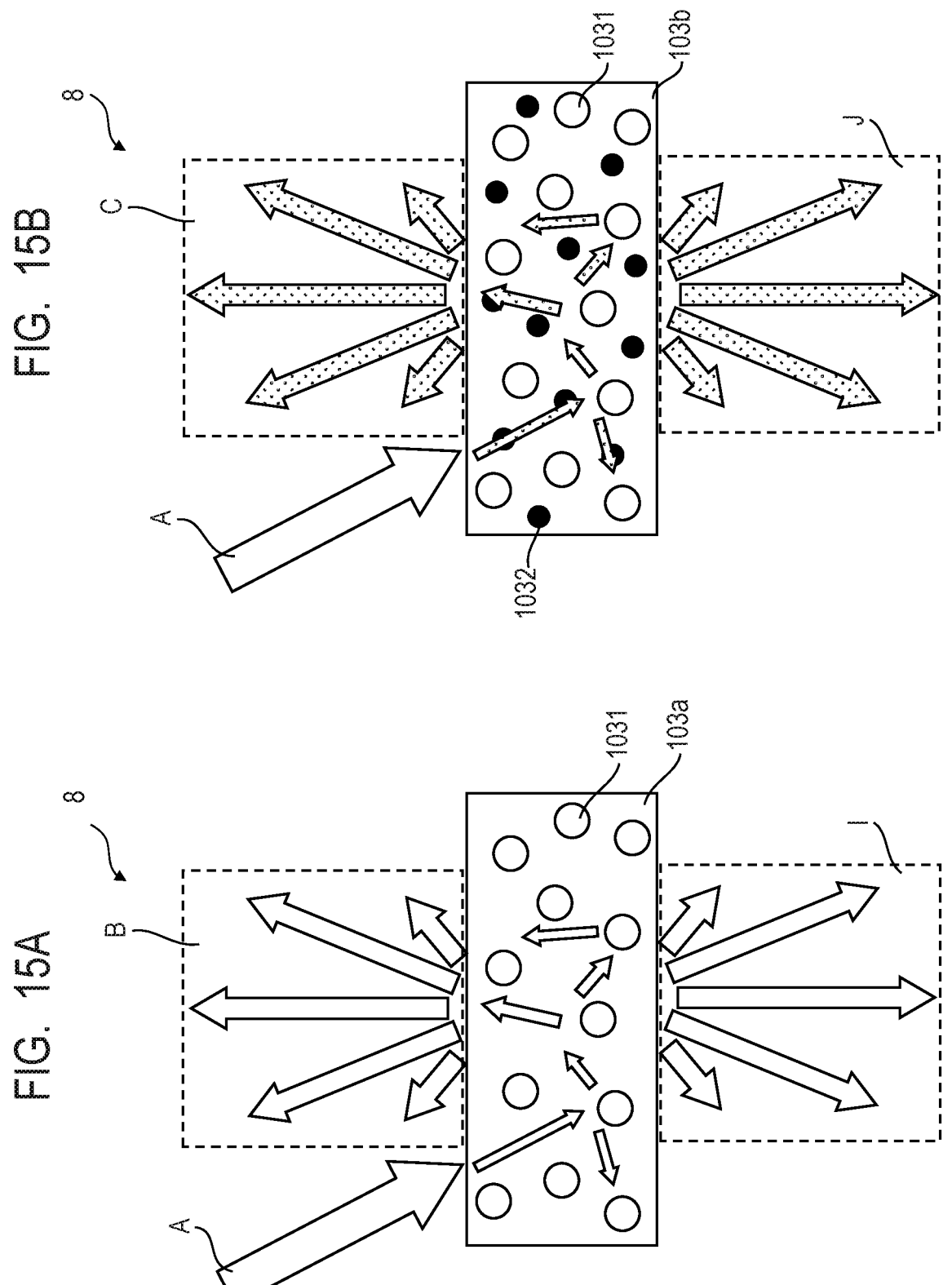
FIG. 15A is a schematic view illustrating a state in which light is reflected or transmitted in the optical apparatus according to the eighth embodiment.
FIG. 15B is a schematic view illustrating a state in which light is reflected or transmitted in the optical apparatus according to the eighth embodiment.

FIG. 15A shows a schematic view illustrating a state in which light is reflected by an object 103a or passes through the object 103a in the optical apparatus 8 according to the present embodiment.

Further, FIG. 15B shows a schematic view illustrating a state in which light is reflected by an object 103b or passes through the object 103b in the optical apparatus 8 according to the present embodiment.

As shown in FIG. 15A, it is assumed that the object 103a contains a main substance 1031 and does not contain an impurity 1032.

At this time, when light A reflected by the first reflecting surface 802a is incident on the object 103a, the light A interacts with the main substance 1031 inside the object 103a, so that light B is diffusely reflected from a front surface of the object 103a and light I diffusely passes through a rear surface of the object 103a.

Here, the front and rear surfaces of the object 103a are surfaces facing the second reflecting surface 801a and the fourth reflecting surface 801b of the object 103a, respectively.

On the other hand, as shown in FIG. 15B, it is assumed that the impurity 1032 is also contained in the object 103b in addition to the main substance 1031.

At this time, when the light A reflected by the first reflecting surface 802a is incident on the object 103b, the light A interacts with the main substance 1031 and the impurity 1032 inside the object 103b, so that light C is diffusely reflected from a front surface of the object 103b and light J diffusely passes through a rear surface of the object 103a.

Therefore, in the optical apparatus 8 according to the present embodiment, the lights I and J which have passed through the objects 103a and 103b are detected by using the light receiving element 104 respectively, and then light amounts thereof are compared with each other.

Thereby, a ratio of the impurity 1032 to the main substance 1031 in the object 103b of the object can be detected.

In the optical apparatus 8 according to the present embodiment, it is possible to guide light which has reciprocated ten times or more between the object 103 and the second reflecting surface 801a and the fourth reflecting surface 801b, namely the light which has been reflected ten times or more by the object 103, to the light receiving element 104 by employing the above-described structure.

Thereby, it is possible to further increase the detected amount T relating to the content of the impurity 1032 in the object 103 as described using FIGS. 6A and 6B by increasing the number of reflections by the object 103, as compared with the optical apparatus 1 according to the first embodiment.

By further increasing the detected amount T, the content of the impurity 1032 in the object 103 can be determined with a higher accuracy.

As described above, in the optical apparatus 8 according to the present embodiment, it is possible to efficiently irradiate the object 103 with light from the light source 100 by providing the first reflecting surface 802a, the second reflecting surface 801a and the fourth reflecting surface 801b.

Further, it is possible to efficiently illuminate the object 103 arranged outside the first reflecting element 800a and the second reflecting element 800b.

In addition, the optical apparatus 8 according to the present embodiment can also detect light passing through the object 103.

In the optical apparatus 8 according to the present embodiment, the first reflecting element 800a and the second reflecting element 800b are provided separately from each other, but they may be provided integrally with each other.

Further, in the optical apparatus 8 according to the present embodiment, the first substrate 1051 and the second substrate 1052 are provided separately from each other, but they may be provided integrally with each other.

Ninth Embodiment

Figure 16A:
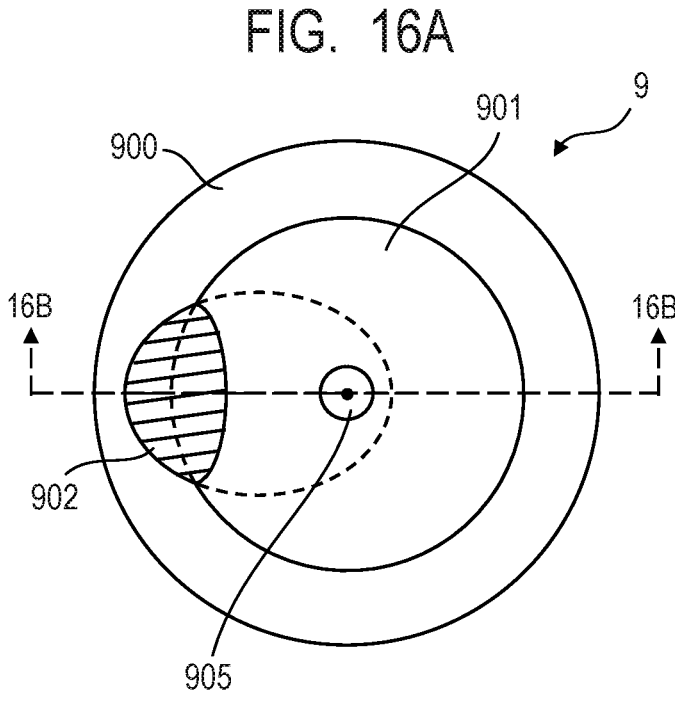
FIG. 16A is a partial projection view of an optical apparatus according to a ninth embodiment of the disclosure.

FIG. 16A shows a partial projection view of an optical apparatus 9 according to a ninth embodiment of the disclosure.

Figure 16B:
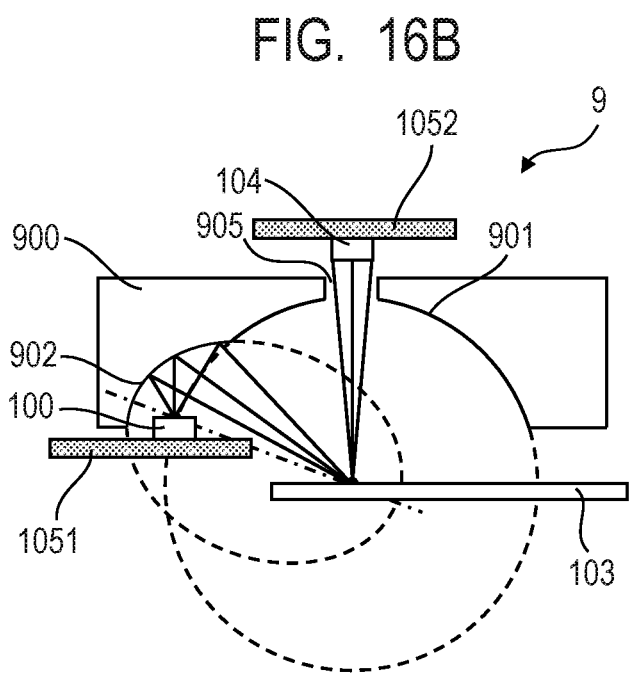
FIG. 16B is a cross-sectional view taken along a line 16B-16B of the optical apparatus according to the ninth embodiment.

Further, FIG. 16B shows a cross-sectional view of the optical apparatus 9 according to the ninth embodiment taken along a line 16B-16B in FIG. 16A.

The optical apparatus 9 according to the present embodiment includes a light source 100, a reflecting element 900 and a first substrate 1051.

The light source 100 is a light emitting unit such as a light emitting diode (LED). As the light source 100, a light emitting element or a light emitting device such as a laser light source or a spectral light source may be used instead of the light emitting diode.

The light receiving element 104 is a light receiving unit such as a photodiode (PD).

The first substrate 1051 and a second substrate 1052 are members configured to hold the light source 100 and the light receiving element 104, respectively.

The reflecting element 900 has a function of reflecting light emitted from the light source 100 and light reflected by the object 103, and a resin is used as a material thereof.

As the material of the reflecting element 900, various materials such as a metal may be used instead of the resin.

In the optical apparatus 9 according to the present embodiment, the second reflecting surface 901 and the first reflecting surface 902 any of which is a mirror surface subjected to a metal vapor deposition are formed in the reflecting element 900.

The second reflecting surface 901 and the first reflecting surface 902 may be provided with various reflecting means such as a total reflection or a glossy coating instead of the metal vapor deposition.

Further, an opening 905 (a second opening) through which a part of the light reflected by the object 103 passes is formed in a part of the reflecting element 900 including the second reflecting surface 901 as shown in FIGS. 16A and 16B.

Each of the second reflecting surface 901 and the first reflecting surface 902 has a curved surface defined by the expression (2) described above when an intersection point with the optical axis is defined as an origin, an axis parallel to the optical axis is defined as an X axis, and a cross section perpendicular to the optical axis is defined as a YZ cross section.

The first reflecting surface 902 is an aspherical surface having a conic coefficient K in the range of $-1.0 \leq K < 0.0$, as indicated by a hatched portion in FIG. 16A.

Specifically, the first reflecting surface 902 is a part of a spheroidal surface having a curvature radius R of 7.5 mm and the conic coefficient K of $-0.444$.

Further, an optical axis passing through a surface vertex and a focal point of the first reflecting surface 902 is inclined by 20.964° with respect to a reference plane.

Furthermore, the second reflecting surface 901 is a part of a spherical surface having the curvature radius R of 18 mm and the conic coefficient K of 0.

As shown in FIG. 16B, the light source 100 is arranged to include one focal point of the first reflecting surface 902.

On the other hand, the light receiving element 104 is arranged outside the reflecting element 900.

Further, the first reflecting surface 902 and the second reflecting surface 901 are formed in the reflecting element 900 such that the other focal point of the first reflecting surface 902 is arranged in the vicinity of a center of the second reflecting surface 901.

The object 103 is arranged so as to include the other focal point of the first reflecting surface 902.

In addition, in the optical apparatus 9 according to the present embodiment, a distance between a center of the light source 100 and a center of the light receiving element 104 is equal to that between focal points of the first reflecting surface 902 in the reference plane.

As shown in FIG. 16B, a part of light emitted from the light source 100 is incident on the first reflecting surface 902 in the optical apparatus 9 according to the present embodiment.

Then, the light reflected by the first reflecting surface 902 toward the object 103 is reflected by the object 103, and then a part of the light is incident on the second reflecting surface 901 or incident on the light receiving element 104 after passing through the opening 905.

Next, the light incident on the second reflecting surface 901 is reflected by the second reflecting surface 901 to be incident on the object 103 again.

Then, a part of the light reflected again by the object 103 is incident on the second reflecting surface 901 again or incident on the light receiving element 104 after passing through the opening 905.

In the optical apparatus 9 according to the present embodiment, it is possible to guide light which has reciprocated ten times or more between the object 103 and the second reflecting surface 901, namely the light which has been reflected ten times or more by the object 103, to the light receiving element 104 by employing the above-described structure.

Thereby, it is possible to further increase the detected amount T relating to the content of the impurity 1032 in the object 103 as described using FIGS. 6A and 6B by increasing the number of reflections by the object 103, as compared with the optical apparatus 1 according to the first embodiment.

By further increasing the detected amount T, the content of the impurity 1032 in the object 103 can be determined with a higher accuracy.

As described above, in the optical apparatus 9 according to the present embodiment, it is possible to efficiently irradiate the object 103 with light from the light source 100 by providing the first reflecting surface 902 and the second reflecting surface 901.

Further, it is possible to efficiently illuminate the object 103 arranged outside the reflecting element 900.

In addition, in the optical apparatus 9 according to the present embodiment, it is possible to increase a degree of freedom of arrangements of the second substrate 1052 and the object 103 since they are spaced away from each other.

[Measuring Apparatus]

FIGS. 17A and 17B each show a schematic cross-sectional view of a measuring apparatus 50 according to the aspect of the embodiments.

The measuring apparatus 50 according to the aspect of the embodiments includes a light source 100, a reflecting element 200, a light receiving element 104, a substrate 105, a light emission controlling device 1000 (a light emission controller), a calculating device 2000 (a calculating unit), a storing device 3000 (a storing unit) and an outputting device 4000 (an outputting unit).

Note that structures of the light source 100, the reflecting element 200 and the substrate 105 provided in the measuring apparatus 50 according to the disclosure are the same as those of the optical apparatus 2 according to the second embodiment, so that description thereof is omitted.

The light emission controlling device 1000 is configured to control a light amount, a light emission timing and the like of light emitted from the light source 100.

The calculating device 2000 is configured to perform various calculations for calculating the detected amount T, namely the content of the impurity 1032 in the object 103 or the like based on an output of the light receiving element 104, specifically a light amount of light received by the light receiving element 104.

The storing device 3000 is configured to store a calculation result by the calculating device 2000 and output the stored calculation result to the calculating device 2000.

The outputting device 4000 is a monitor or an external outputting terminal for example, and is configured to output various calculation results calculated by the calculating device 2000.

First, the measuring apparatus 50 according to the aspect of the embodiments performs a measurement on a standard object (a reference object) 113 as shown in FIG. 17A.

Here, as the standard object 113, a standard white plate whose characteristics are known in advance, specifically in which a content of an impurity is known in advance is used, for example.

Specifically, the standard object 113 is illuminated with light set so as to be emitted from the light source 100 at a predetermined light amount by the light emission controlling device 1000, and then light having a predetermined light amount is detected by the light receiving element 104 as shown in the second embodiment.

Then, the calculating device 2000 performs an averaging process or the like on the detected light amount to obtain a light amount I1, and then the light amount I1 is stored in the storing device 3000 as a detection result for the standard object 113.

Next, the measuring apparatus 50 according to the aspect of the embodiments performs a measurement on an inspected object 123 as shown in FIG. 17B.

Here, the inspected object 123 is an object containing an impurity as an inspected target.

Specifically, the inspected object 123 is illuminated with light set so as to be emitted from the light source 100 at a predetermined light amount by the light emission controlling device 1000, and then light having a predetermined light amount is detected by the light receiving element 104 as shown in the second embodiment.

Next, the calculating device 2000 performs the averaging process or the like on the detected light amount to obtain a light amount I2.

Then, the calculating device 2000 reads out the detection result for the standard object 113, namely the light amount I1 from the storing device 3000, and then calculates a relative light amount RI, namely a detected amount T from a ratio between the light amount I1 and the light amount I2. Thereby, the content of the impurity in the inspected object 123 can be calculated.

Then, the result calculated by the calculating device 2000 is output by the outputting device 4000.

[Image Forming Apparatus]

Figure 18:
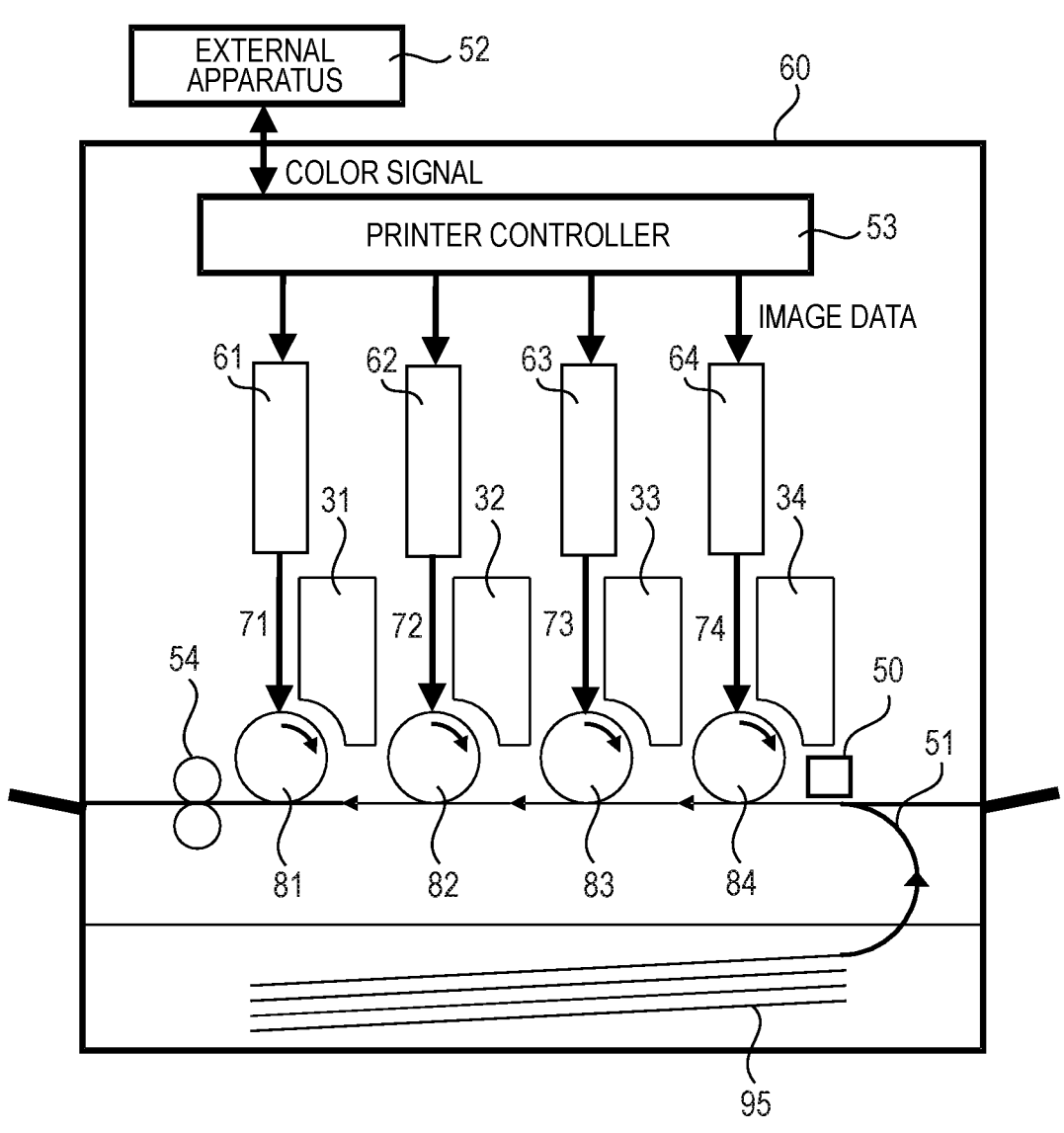
FIG. 18 is a sub-scanning cross-sectional view of a main part of an image forming apparatus according to an embodiment.

FIG. 18 shows a sub-scanning cross-sectional view of a main part of an image forming apparatus 60 in which the measuring apparatus 50 according to the aspect of the embodiments is mounted.

The image forming apparatus 60 is a tandem type color image forming apparatus in which four light scanning apparatuses are arranged in parallel, and each of the light scanning apparatuses records image information on a surface of a photosensitive drum serving as an image bearing member.

The image forming apparatus 60 includes light scanning apparatuses 61, 62, 63 and 64, and photosensitive drums 81, 82, 83 and 84 as image bearing members.

Further, the image forming apparatus 60 includes developing units 31, 32, 33 and 34, a measuring apparatus 50, a conveying belt 51, a printer controller 53, a fixing unit 54 and a sheet cassette 95.

R (red), G (green) and B (blue) color signals (code data) are input to the image forming apparatus 60 from an external apparatus 52, such as a personal computer. The input color signals are converted into image data of C (cyan), M (magenta), Y (yellow) and K (black) by the printer controller 53 in the apparatus. The converted image data are input to the light scanning apparatuses 61, 62, 63 and 64 as the image signal and the image information. Then, light fluxes 71, 72, 73 and 74 modulated in accordance with the respective image data are emitted from the light scanning apparatuses 61, 62, 63 and 64. Photosensitive surfaces (scanned surfaces) of the photosensitive drums 81, 82, 83 and 84 are scanned in the main scanning direction by these light fluxes.

In the image forming apparatus 60, for example, the image signal of C (cyan) is inputted to the light scanning apparatus 61, the image signal of M (magenta) is inputted to the light scanning apparatus 62, the image signal of Y (yellow) is inputted to the light scanning apparatus 63, and the image signal of K (black) is inputted to the light scanning apparatus 64. Then, they record the image signals in parallel on the photosensitive surfaces of the photosensitive drums 81, 82, 83 and 84, respectively to print color image at a high speed.

As described above, an electrostatic latent image of each color is formed on the photosensitive surface of corresponding one of the photosensitive drums 81, 82, 83 and 84 by using the light fluxes based on each image data from the four light scanning apparatuses 61, 62, 63 and 64 in the image forming apparatus 60.

After that, the electrostatic latent images of respective colors are developed into respective color toner images by the developing units 31, 32, 33 and 34, and the developed respective color toner images are multiply transferred by a transferring unit to a transferred material conveyed by the conveying belt 51. Then, the transferred toner image is fixed by the fixing unit 54 to form a full color image.

Further, in the image forming apparatus 60, the measuring apparatus 50 according to the aspect of the embodiments is provided in the vicinity of the sheet cassette 95.

Then, an amount of moisture (water) contained in the transferred material fed from the sheet cassette 95 can be measured by using the measuring apparatus 50 according to the aspect of the embodiments, and various adjustments can be performed in the image forming apparatus 60 based on the measurement result.

As the external apparatus 52, for example, a color image reading apparatus including a charge coupled device (CCD) sensor may be used. In this case, a color digital copier is formed by this color image reading apparatus and the image forming apparatus 60.

Further, the image forming apparatus 60 is not limited to the structure including the four light scanning apparatuses and the four photosensitive drums. For example, one light scanning apparatus and one photosensitive drum may be provided. In addition, the number of the light scanning apparatuses and the photosensitive drums may be two, three, five or more, respectively.

Although exemplary embodiments have been described above, the disclosure is not limited to these embodiments, and various modifications and changes can be made within the scope of the gist of the disclosure.

For example, in the optical apparatuses according to the second to ninth embodiments, a shape of each reflecting surface is defined by the expression (2) described above, but the aspect of the embodiments is not limited thereto. A higher order aspherical surface shape may be added in order to further improve optical aberrations.

In the optical apparatuses according to the second to ninth embodiments, all aspherical surfaces are formed by spheroidal surfaces or paraboloid-of-revolution (paraboloidal) surfaces, but the disclosure is not limited thereto. That is, if a part of the aspherical surfaces is formed into the spheroidal surfaces and the remaining aspherical surfaces are formed into the paraboloid-of-revolution surfaces, or if a higher order aspherical surface shape is added to a part of the aspherical surfaces, an effect equivalent to that of the aspect of the embodiments can be obtained.

In the optical apparatuses according to the second to ninth embodiments, if the first reflecting surface and the second reflecting surface are formed so as to be parts of a spherical surface and have curvatures different from each other, an effect equivalent to that of the disclosure can be obtained.

In the optical apparatuses according to the second to ninth embodiments, if the first reflecting surface is formed so as to be a part of a spherical surface and the second reflecting surface is formed so as to be a part of an aspherical surface, an effect equivalent to that of the disclosure can be obtained.

In the optical apparatuses according to the first to ninth embodiments, a region in which the light source and the light receiving element are arranged, the number of the light sources and the light receiving elements, and the like can be changed within the scope of the gist of the disclosure.

In the optical apparatuses according to the first to ninth embodiments, it is also possible to calculate a content of a plurality of kinds of substances contained in an object, in other words at least one kind of substance, by using a light source which emits a plurality of lights having wavelengths different from each other.

In this case, the light receiving element may also be configured to be capable of independently detecting the plurality of lights having wavelengths different from each other.

According to the aspect of the embodiments, it is possible to provide an optical apparatus capable of efficiently irradiating an object with light in a compact structure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-207657, filed Dec. 22, 2021, which is hereby incorporated by reference herein in its entirety.

What is claimed is:

1. An apparatus comprising:
a light source;
a light receiving element;
a first surface configured to reflect light from the light source toward an object;
a second surface with a shape different from a shape of the first surface, the second surface being configured to reflect a part of the light from the object toward the object;
a third surface configured to reflect a part of the light reflected by the second surface and then reflected by the object, toward the light receiving element;
a scanning unit configured to scan a scanned surface; and a controller configured to convert a signal output from an external apparatus into image data and input the image data to the scanning unit.

2. The apparatus according to claim 1, wherein the first and second surfaces have curvatures different from each other.

3. The apparatus according to claim 1, wherein when an intersection point with an optical axis is defined as an origin, an axis parallel to the optical axis is defined as an X axis, a cross section perpendicular to the optical axis is defined as a YZ cross section, a curvature radius is represented by R, a conic coefficient is represented by K, and shapes of the first, second and third surfaces are defined by the following equality:

$$X = \frac{\dfrac{h^2}{R}}{1 + \sqrt{1 - (1+K)\left(\dfrac{h}{R}\right)^2}}$$

where $h = \sqrt{Y^2 + Z^2}$, the following inequality is satisfied in at least one of the first, second and third surfaces:

$$-1.0 \leq K < 0.0.$$

4. The apparatus according to claim 3, wherein the following inequality is satisfied in the first surface:

$$-1.0 \leq K < 0.0.$$

5. The apparatus according to claim 4, wherein the light source is arranged so as to include a first focal point of the first surface.

6. The apparatus according to claim 4, wherein the first surface is a part of a spheroidal surface.

7. The apparatus according to claim 6, wherein the object is arranged so as to include a second focal point of the first surface.

8. The apparatus according to claim 6,
wherein the second surface is a part of a spherical surface, and
wherein a second focal point of the first surface and a center of the second surface are located at a same position.

9. The apparatus according to claim 4, wherein the first surface is a part of a paraboloid-of-revolution surface.

10. The apparatus according to claim 1, further comprising a substrate with a first opening formed therein through which the light reflected by the first surface passes, the substrate being configured to hold the light source.

11. The apparatus according to claim 10, wherein an optical axis of the first surface is not parallel to a surface of the substrate.

12. The apparatus according to claim 1, wherein the second surface has a shape in which a large number of fine corner cubes are arranged.

13. The apparatus according to claim 1, wherein the first and second surfaces are connected to each other.

14. The apparatus according to claim 1, further comprising a calculating unit configured to calculate a content of at least one kind of substance in the object based on an output of the light receiving element.

15. The apparatus according to claim 1, wherein the light receiving element is arranged so as to include a first focal point of the third surface.

16. The apparatus according to claim 1,
wherein a second opening through which a part of the light reflected by the object passes is formed in the second surface, and
wherein the light receiving element is arranged so as to receive light passing through the second opening.

17. The apparatus according to claim 16,
wherein the first surface is a part of a spheroidal surface, and
wherein a distance between a center of the light source and a center of the light receiving element is equal to a distance between first and second focal points of the first surface in a reference plane of the apparatus.

18. The apparatus according to claim 1, further comprising:
a developing unit configured to develop, as a toner image, an electrostatic latent image formed on the scanned surface by the scanning unit;
a transferring unit configured to transfer the developed toner image onto a transferred material; and
a fixing unit configured to fix the transferred toner image on the transferred material.

19. An apparatus comprising:
a light source;
a light receiving element;
a first surface configured to reflect light from the light source toward an object;
a second surface with a shape different from a shape of the first surface, the second surface being configured to reflect a part of the light from the object toward the object;
a third surface configured to reflect a part of the light reflected by the second surface and then reflected by the object, toward the light receiving element;
a scanning unit configured to scan a scanned surface;
a developing unit configured to develop, as a toner image, an electrostatic latent image formed on the scanned surface by the scanning unit;
a transferring unit configured to transfer the developed toner image onto a transferred material; and
a fixing unit configured to fix the transferred toner image on the transferred material.

* * * * *